United States Patent
Jeon et al.

(10) Patent No.: US 12,152,722 B2
(45) Date of Patent: Nov. 26, 2024

(54) DISPLAY APPARATUS AND TILED DISPLAY APPARATUS INCLUDING THE SAME

(71) Applicant: LG DISPLAY CO., LTD., Seoul (KR)

(72) Inventors: Eungi Jeon, Paju-si (KR); YoungKyu Bang, Paju-si (KR); Sunghwan Yoon, Paju-si (KR); Heeseung Lim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 397 days.

(21) Appl. No.: 17/555,089

(22) Filed: Dec. 17, 2021

(65) Prior Publication Data

US 2022/0205582 A1 Jun. 30, 2022

(30) Foreign Application Priority Data

Dec. 28, 2020 (KR) .................. 10-2020-0184788

(51) Int. Cl.
*G09F 15/00* (2006.01)
*F16M 11/04* (2006.01)
*F16M 11/08* (2006.01)
*G06F 1/16* (2006.01)
*G09F 9/302* (2006.01)

(52) U.S. Cl.
CPC ........... *F16M 11/08* (2013.01); *F16M 11/041* (2013.01); *G06F 1/1637* (2013.01); *G09F 9/3026* (2013.01)

(58) Field of Classification Search
CPC .... F16M 11/08; F16M 11/041; F16M 11/045; F16M 11/2014; F16M 13/02; G06F 1/1637; G09F 9/3026; G09F 9/302; G09F 9/3023
See application file for complete search history.

(56) References Cited

U.S. PATENT DOCUMENTS

| D505,858 S | * | 6/2005 | O'Keene ..................... D8/355 |
| 7,779,568 B2 | * | 8/2010 | Gettelfinger ............. G09F 7/20 |
| | | | 40/606.15 |
| 8,104,204 B1 | * | 1/2012 | Syrstad ................. G09F 9/3026 |
| | | | 40/544 |

(Continued)

FOREIGN PATENT DOCUMENTS

| CN | 1994035 A | 7/2007 |
| CN | 103423564 A | 12/2013 |

(Continued)

OTHER PUBLICATIONS

Chinese Office Action dated Dec. 7, 2023 issued in Patent Application No. 202111507977.9 (10 pages).

*Primary Examiner* — Amy J. Sterling
(74) *Attorney, Agent, or Firm* — POLSINELLI PC

(57) ABSTRACT

A display apparatus includes a display panel and a support module configured to support the display panel, wherein the support module includes: a rotating frame configured to support the display panel, a fixed frame configured to support the rotating frame, and a link structure disposed between the fixed frame and the rotating frame and configured to rotate the rotating frame through at least four-bar link structure, so that the display panel is easily detachably attached to the rotating frame, thereby shortening a time for an operation of replacing, repairing, or installation of the display panel.

19 Claims, 12 Drawing Sheets

(56) References Cited

U.S. PATENT DOCUMENTS

| | | | |
|---|---|---|---|
| 8,333,355 B2 * | 12/2012 | Stifal | F16M 11/2092 |
| | | | 248/920 |
| 9,265,346 B1 * | 2/2016 | Forney | A47B 97/001 |
| 9,279,573 B1 | 3/2016 | Perez-Bravo et al. | |
| 9,712,780 B2 * | 7/2017 | Oya | F16M 11/2092 |
| 10,139,045 B1 * | 11/2018 | Keuter | F16M 11/38 |
| 10,738,941 B2 * | 8/2020 | Newville | F16M 11/2092 |
| 10,859,201 B2 * | 12/2020 | Newville | F16M 11/08 |
| 11,287,080 B2 * | 3/2022 | Newville | F16M 11/121 |
| 2008/0100186 A1 * | 5/2008 | Li | H04N 5/645 |
| | | | 312/223.2 |
| 2011/0101185 A1 * | 5/2011 | Kitaguchi | F16M 13/02 |
| | | | 248/222.14 |

FOREIGN PATENT DOCUMENTS

| | | |
|---|---|---|
| CN | 106287143 A | 1/2017 |
| CN | 208779022 U | 4/2019 |
| CN | 210004044 U | 1/2020 |
| CN | 210240983 U | 4/2020 |
| CN | 210344768 U | 4/2020 |
| KR | 100714232 B1 | 5/2007 |
| KR | 100969249 B1 | 7/2010 |

* cited by examiner

DISPLAY APPARATUS AND TILED DISPLAY APPARATUS INCLUDING THE SAME

CROSS-REFERENCE TO RELATED APPLICATION

This application claims the priority of the Korean Patent Application No. 10-2020-0184788 filed on Dec. 28, 2020, which is hereby incorporated by reference in its entirety as if fully set forth herein.

BACKGROUND

Field of the Disclosure

The present disclosure relates to a display apparatus for displaying an image and a tiled display apparatus including the same.

Description of the Background

In general, tiled display apparatuses are apparatuses installed in an indoor or outdoor exhibition hall, a stage, etc. to display various types of visual information, and have gradually been increased in size in line with the development of information technology. In recent years, a large screen is implemented by connecting a plurality of display panels to deliver images in the form of a large screen.

In a tiled display apparatus, one or more display panels are arranged in a matrix form in a quadrangular frame or housing having a predetermined width and length.

Such a tiled display apparatus is installed in such a manner of reinforcing a member for thickness adjustment on a rear surface of a display panel in order to prevent an occurrence of bright lines or dark lines between the display panels adjacent to each other vertically and horizontally.

Meanwhile, the tiled display apparatus not only takes a long time to install because a plurality of display panels should be connected but also is difficult to replace or repair because it is not easy to detachably attach only a broken display panel when one display panel is broken because a plurality of display panels are connected to each other.

SUMMARY

Accordingly, the present disclosure is directed to providing a display apparatus and tiled display apparatus including the same that substantially obviate one or more problems due to limitations and disadvantages of the conventional art.

An aspect of the present disclosure is directed to providing a display apparatus that facilitates assembly and disassembly of a display panel and a tiled display apparatus including the same.

Additional advantages and features of the disclosure will be set forth in part in the description which follows and in part will become apparent to those having ordinary skill in the art upon examination of the following or may be learned from practice of the disclosure. Other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a display apparatus including: a display panel and a support module configured to support the display panel, wherein the support module includes: a rotating frame configured to support the display panel; a fixed frame configured to support the rotating frame, and a link structure disposed between the fixed frame and the rotating frame and configured to rotate the rotating frame through at least four-bar link structure.

In another aspect of the present disclosure, there is provided a display apparatus including: a stand frame; a plurality of support brackets arranged in the stand frame; a plurality of positioning modules connected to the plurality of support brackets, respectively; and a plurality of display apparatuses tiled to the plurality of positioning modules, respectively.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspects of the disclosure and together with the description serve to explain the principle of the disclosure.

In the drawings.

DETAILED DESCRIPTION

Figure 1:
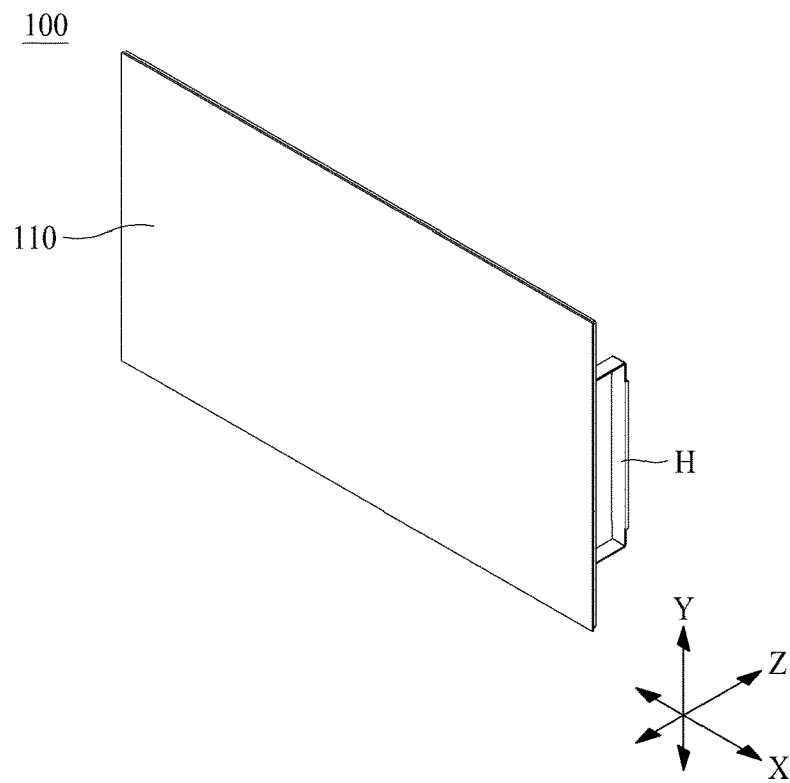
FIG. 1 is a schematic perspective view of a display apparatus according to an aspect of the present disclosure.

Reference will now be made in detail to the aspects of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these aspects are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing aspects of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~' a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, terms such as first, second, A, B, (a), (b), etc., may be used. Such terms are used for merely discriminating the corresponding elements from other elements and the corresponding elements are not limited in their essence, sequence, or precedence by the terms. It will be understood that when an element or layer is referred to as being "on" or "connected to" another element or layer, it may be directly on or directly connected to the other element or layer, or intervening elements or layers may be present. Also, it should be understood that when one element is disposed on or under another element, this may denote a case where the elements are disposed to directly contact each other, but may denote that the elements are disposed without directly contacting each other.

The term "at least one" should be understood as including any and all combinations of one or more of the associated listed elements. For example, the meaning of "at least one of a first element, a second element, and a third element" denotes the combination of all elements proposed from two or more of the first element, the second element, and the third element as well as the first element, the second element, or the third element.

Features of various aspects of the present disclosure may be partially or overall coupled to or combined with each other, and may be variously inter-operated with each other and driven technically as those skilled in the art may sufficiently understand. The aspects of the present disclosure may be carried out independently from each other, or may be carried out together in co-dependent relationship.

Hereinafter, aspects of the present disclosure will be described in detail with reference to the accompanying drawings.

Figure 2:
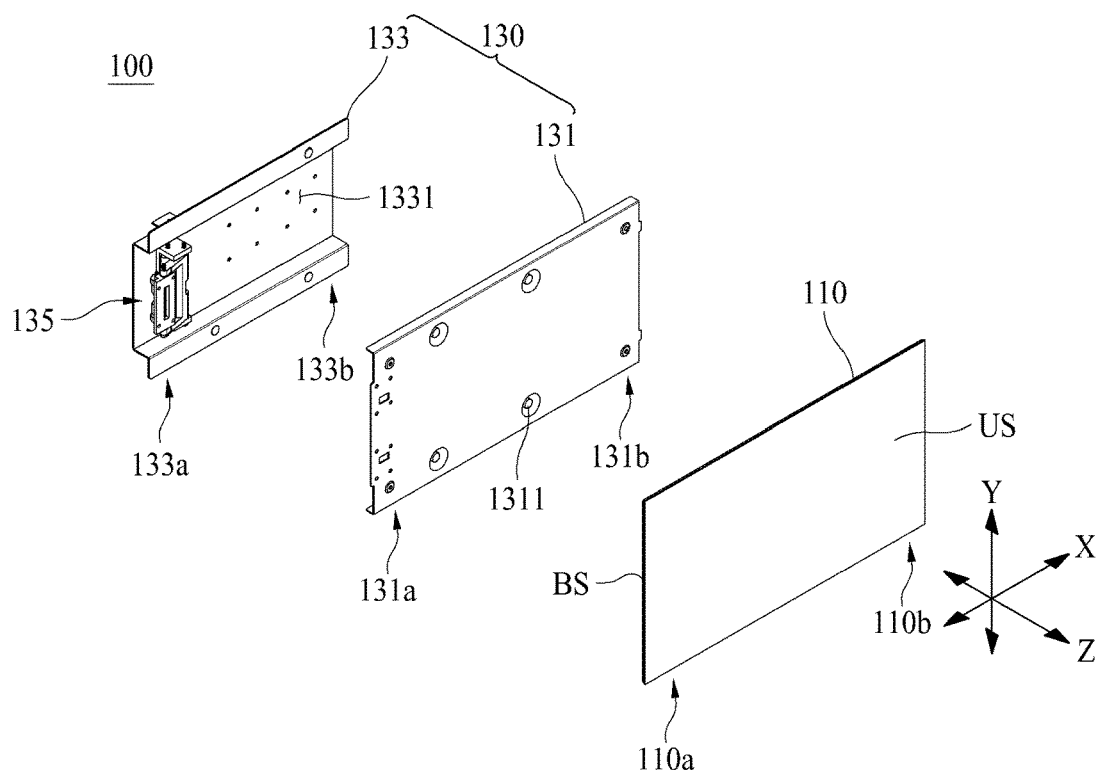
FIG. 2 is a schematic exploded perspective view of a display apparatus according to an aspect of the present disclosure.
Figure 3A:
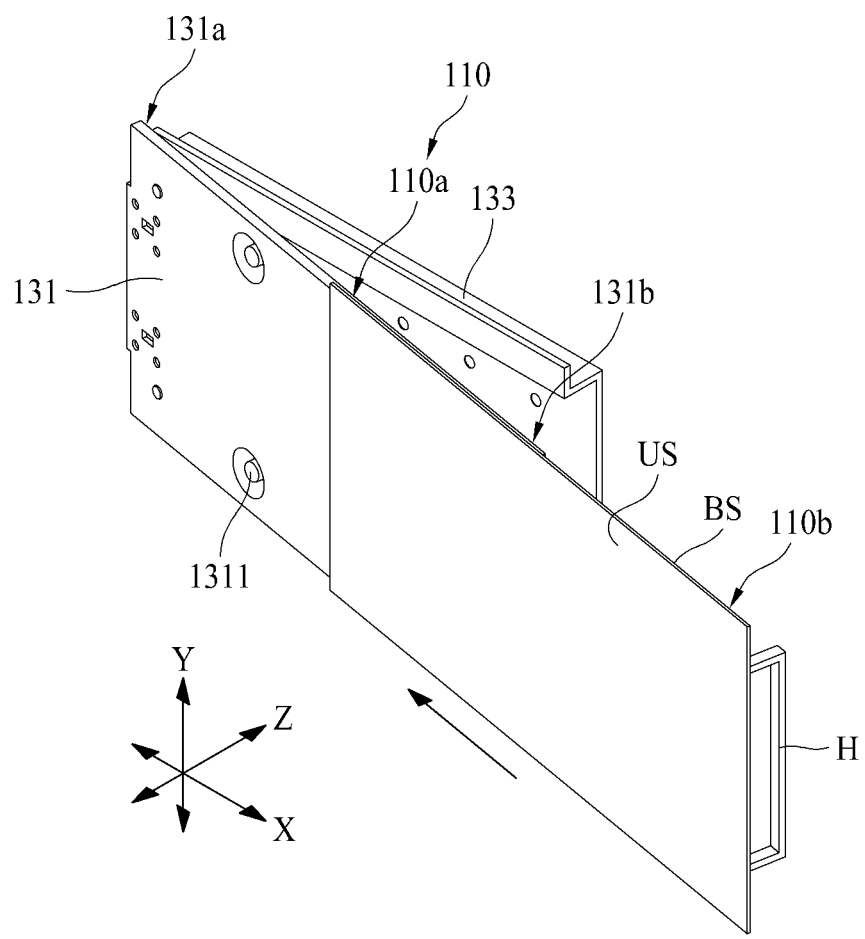
FIG. 3A is a schematic operation state diagram showing that a display panel is coupled to a rotating frame in an open position of a display apparatus according to an aspect of the present disclosure.
Figure 3B:
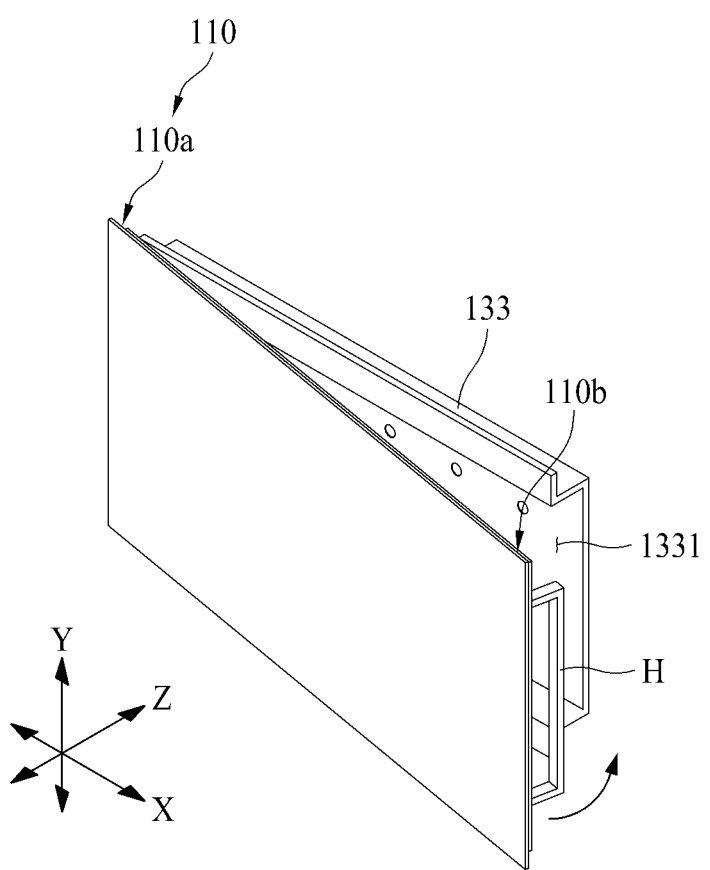
FIG. 3B is a schematic operation state diagram showing switching from an open position to a closed position of a display apparatus according to an aspect of the present disclosure.
Figure 4:
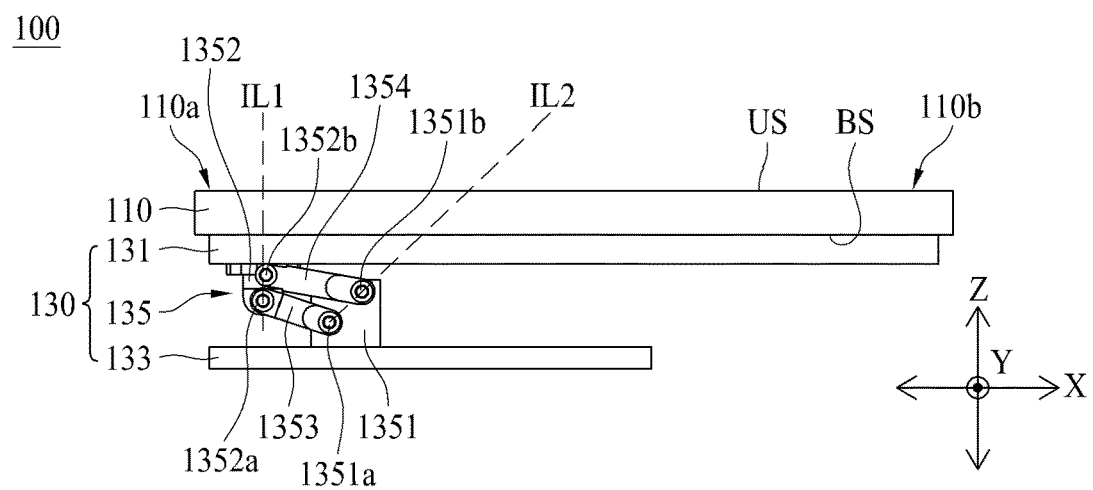
FIG. 4 is a schematic bottom view of a display apparatus according to an aspect of the present disclosure.
Figure 5:
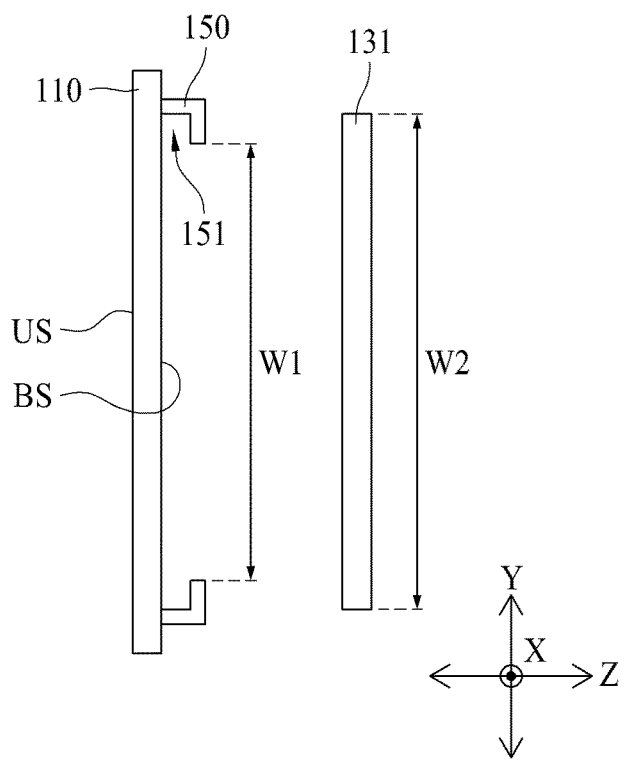
FIG. 5 is a schematic view comparing lengths of the display panel and a rotating frame of a display apparatus according to an aspect of the present disclosure.

FIG. 1 is a schematic perspective view of a display apparatus according to an aspect of the present disclosure, FIG. 2 is a schematic exploded perspective view of a display apparatus according to an aspect of the present disclosure, FIG. 3A is a schematic operation state diagram showing that a display panel is coupled to a rotating frame in an open position of a display apparatus according to an aspect of the present disclosure, FIG. 3B is a schematic operation state diagram showing switching from an open position to a closed position of a display apparatus according to an aspect of the present disclosure, FIG. 4 is a schematic bottom view of a display apparatus according to an aspect of the present disclosure, and FIG. 5 is a schematic view comparing lengths of the display panel and a rotating frame of a display apparatus according to an aspect of the present disclosure.

Referring to FIGS. 1 to 5, the display apparatus 100 according to an aspect of the present disclosure includes a display panel 110 and a support module 130 supporting the display panel 110. The support module 130 includes a rotating frame 131, a fixed frame 133, and a link structure 135.

The display panel 110 may be provided in a rectangular shape as a whole. The display panel 110 may be coupled to the support module 130. As shown in FIGS. 3A and 3B, the display panel 110 may be coupled to the rotating frame 131 of the support module 130 in a sliding manner. The display panel 110 may be detached from the rotating frame 131 by sliding in a direction opposite to a coupled direction while being coupled to the rotating frame 131. That is, the display panel 110 may be detachably attached to the rotating frame 131 in a sliding manner.

The rotating frame 131 may support the display panel 110. The rotating frame 131 may support the display panel 110 as the display panel 110 is coupled to the rotating frame 131.

When the display panel 110 is coupled to the rotating frame 131, a rear surface BS (or lower surface) of the display panel 110 may be disposed to face the front surface of the rotating frame 131. Here, the rear surface BS of the display panel 110 may refer to a surface opposite to a front surface US (or upper surface) of the display panel 110 on which an image is output.

The rotating frame 131 may be provided in a rectangular shape as a whole so that the display panel 110 may be coupled thereto. The rotating frame 131 may be provided to be smaller than a size of the display panel 110. When the display panel 110 is coupled, the rotating frame 131 may be disposed on the rear surface BS of the display panel 110. Accordingly, the rotating frame 131 may not be identified by a user located in front of the front surface US of the display panel 110 on which an image is output.

The rotating frame 131 may be rotatably coupled to the fixed frame 133 through the link structure 135. Accordingly, when the display panel 110 is coupled to the rotating frame 131, the display panel 110 may be rotated together with the rotating frame 131. The rotating frame 131 may be rotated when the display panel 110 is repaired or replaced or when installed in the support module 130. That is, the rotating frame 131 may be rotated when the display panel 110 is detachably attached. Hereinafter, as shown in FIG. 3A, a position in which the rotating frame 131 and the display panel 110 are inclined with respect to the fixed frame 133 in order to couple the display panel 110 to the rotating frame 131 is referred to as an open position. Also, as shown in FIG. 4, after the display panel 110 is coupled to the rotating frame 131, a position in which the rotating frame 131 and the display panel 110 are arranged parallel to the fixed frame 133 is defined as the closed position. In the closed position, the front surface US of the display panel 110 and the front surface of the fixed frame 133 may be disposed parallel to each other. The front surface of the fixed frame 133 may refer to a surface facing the rear surface of the rotating frame 131. Meanwhile, in the open position, the display panel 110 may be removed from the rotating frame 131 for replacement and repair of the display panel 110.

The fixed frame 133 may support the rotating frame 131. The fixed frame 133 may be coupled to the rotating frame 131 through the link structure 135 to support the rotating frame 131. When the display panel 110 is coupled to the rotating frame 131, the fixed frame 133 may support both the rotating frame 131 and the display panel 110. The fixed frame 133 may be coupled to a stand frame 1100 to be described later, thereby being supported on the stand frame 1100 to support the rotating frame 131 and the display panel 110.

The fixed frame 133 may be formed in a rectangular shape as a whole. The fixed frame 133 may be formed to have the same size as the rotating frame 131 or may be formed to be smaller. Accordingly, the rotating frame 131 rotated through the link structure 135 may be caught by the fixed frame 133 and may no longer be rotated. That is, the fixed frame 133 may have a stopper function to prevent rotation of the rotating frame 131.

As shown in FIG. 2, the link structure 135 may be disposed between the fixed frame 133 and the rotating frame 131. More specifically, the link structure 135 may be coupled to an edge portion of one side 133a of the fixed frame 133 and an edge portion of one side 131a of the rotating frame 131 and may be disposed between the edge portion of one side 133a of the fixed frame 133 and the edge portion of one side 131a of the rotating frame 131. Accordingly, the other side 131b of the rotating frame 131 may be rotated based on the edge portion of the one side 133a of the fixed frame 133 to which the link structure 135 is coupled.

The link structure 135 may be provided as at least a four-bar link structure. For example, as shown in FIG. 4, the link structure 135 may be provided in a trapezoidal shape in which four link members having different lengths are connected to each other. Accordingly, when an external force is applied to the rotating frame 131, the four link members may be organically rotated with respect to a portion fixed to the fixed frame 133.

More specifically, when the edge portion of the other side 131b of the rotating frame 131 is rotated in a first rotation direction from the rear surface BS of the display panel 110 toward the front surface US by an external force, a shape of the link structure 135 may be changed according to a length and angle of each link member. Accordingly, the rotating frame 131 may be disposed to be inclined with respect to the fixed frame 133, and the other side 131b of the rotating frame 131 may be disposed to be spaced apart farther from the fixed frame 133 than one side 131a of the rotating frame 131. That is, in the open position, the other side 131b of the rotating frame 131 may be disposed to protrude further in a third direction (Z direction) than one side 131a of the rotating frame 131 so that the display panel 110 may be easily coupled (or attached) or removed (or drawn out) when the other side 131b of the rotating frame 131 is rotated in a direction toward the front surface US of the display panel.

When the edge portion of the other side 131b of the rotating frame 131 is rotated by an external force in a second rotation direction from the front surface US to the rear surface B S of the display panel 110, the link structure 135 may be restored to the shape when it is in the closed position. In this case, one side 131a and the other side 131b of the rotating frame 131 may be disposed on the same plane, and the display panel 110 coupled to the rotating frame 131 may be disposed to be parallel to the fixed frame 133.

As a result, the link structure 135 may function as a rotation axis of the rotating frame 131 with respect to the fixed frame 133, while connecting the fixed frame 133 and the rotating frame 131.

The display apparatus 100 according to an aspect of the present disclosure is provided so that the rotating frame 131 may rotate with respect to the fixed frame 133 through the link structure 135, so that it is possible to easily switch from the closed position to the open position or from the open position to the closed position, and accordingly, the display panel 110 may be easily attached to and detached from the rotating frame 131, thereby reducing replacement and repair work time or installation work time.

Although not shown, a back plate formed of a metal material may be provided on the rear surface BS of the display panel 110. The back plate may be provided to be smaller than the size of the display panel 110. The back plate is for easily rotating the rotating frame 131 coupled to the display panel 110.

For example, a plurality of display panels are arranged so that there is almost no gap in order to give the user a sense of unity with the image. In this case, when the display panel is positioned in the closed position, the gap between the plurality of display panels is narrow so that it is difficult to position the display panel to the open position. Accordingly, in the display apparatus 100 according to an aspect of the present disclosure, a user positioned on the front side of the display panel 110 pulls out the back plate formed of a metal material disposed on the rear surface BS of the display panel 110 using a magnet so that the rotating frame 131 coupled to the display panel 110 may be rotated in the first rotation direction to easily position the display panel 110 to the open position.

Referring back to FIG. 3A, the rotating frame 131 may include a magnetic portion 1311 having a magnetism. The magnetic portion 1311 is for maintaining a state in which the rotating frame 131 is coupled to the fixed frame 133, that is, the closed position.

The magnetic portion 1311 may couple the rotating frame 131 to a portion formed of a metallic material in the fixed frame 133 by magnetic force. The magnetic portion 1311 may be disposed on the rotating frame 131 to correspond to a portion of the fixed frame 133 formed of a metal material.

The fixed frame 133 may be formed of a metal material only in the portion where the magnetic portion 1311 is disposed in the rotating frame 131, but is not limited thereto and may be formed entirely of a metal material.

The magnetic portion 1311 may be provided as one or in plurality. As shown in FIG. 2, when a plurality of magnetic portions 1311 are provided, the plurality of magnetic portions 1311 may be disposed to be spaced apart from each other along an extending direction of a longer side from the edge of the longer side of the rotating frame 131. Accordingly, the plurality of magnetic portions 1311 may further increase coupling force between the rotating frame 131 and the fixed frame 133 compared to a case in which only one magnetic portion is disposed.

The magnetic portion 1311 may be arranged to be inserted into a concave recess formed in a direction from the front of the rotating frame 131 toward the rear surface of the rotating frame 131 so as not to interfere with the display panel 110 coupled to the front of the rotating frame 131 in a sliding manner.

The fixed frame 133 may include a receiving recess 1331. The receiving recess 1331 is for receiving a circuit unit (not shown) for controlling the display panel 110. A battery for driving the display panel 110 may be further accommodated in the receiving recess 1331.

The receiving recess 1331 may be provided such that the rest of the fixed frame 133 except for a portion in contact with the rotating frame 131 is concavely inserted in a direction from the front to the rear of the fixed frame 133. Accordingly, as shown in FIG. 2, the receiving recess 1331 may be provided in a central portion of the fixed frame 133 excluding the edge portion of the longer side of the fixed frame 133 in the second direction (Y-axis direction). The link structure 135 may be accommodated in the receiving recess 1331. The link structure 135 may be disposed at an edge portion of one side 133a of the fixed frame 133 in the receiving recess 1331.

The display apparatus 100 according to an aspect of the present disclosure is provided so that the link structure 135 is disposed together in the receiving recess 1331 for receiving the circuit unit, etc., so that an overall thickness of the display apparatus is minimized.

When the display panel 110 is coupled to the rotating frame 131 in a sliding manner in a state in which the circuit unit is positioned in the receiving recess 133, the circuit unit may be connected to the display panel 110 by the user. Like the circuit unit, when the display panel 110 is coupled to the rotating frame 131 in a sliding manner in a state in which the power supply unit is positioned in the receiving recess 133, the power supply unit may be connected to the display panel 110 by the user. Accordingly, the circuit unit and the power supply unit may drive the display panel 110.

Referring to FIG. 3A, in the display apparatus 100 according to an aspect of the present disclosure, the display panel 110 may be detachably attached to the rotating frame 131 in a sliding manner. To this end, the display apparatus 100 according to an aspect of the present disclosure may further include a fastening portion 150.

Referring to FIG. 5, the fastening portion 150 may be provided as a pair so as to be spaced apart from each other on the rear surface BS of the display panel 110. A direction in which the pair of fastening portions 150 are spaced apart may be an extending direction of a shorter side of the display panel 110. That is, it may be the second direction (Y-axis direction) in FIG. 5. The third direction (Z-axis direction) may be a thickness direction of the display panel 110 in a direction perpendicular to the second direction (Y-axis direction). The first direction (X-axis direction) may be an extending direction of the longer side of the display panel 110 in a direction perpendicular to each of the second direction (Y-axis direction) and the third direction (Z-axis direction).

With reference to FIG. 5, the pair of fastening portions 150 may be provided in a '¬' shape and a '⌐' shape, respectively. Accordingly, each of the pair of fastening portions 150 may include an insertion recess 151 into which a portion of the rotating frame 131 is inserted. The pair of fastening portions 150 may be provided as one lengthwise along the extending direction of the longer side of the display panel 110, or a plurality of fastening portions 150 may be provided to be spaced apart from each other.

A length W1 by which the pair of fastening portions 150 are spaced apart in the second direction (Y-axis direction) may be shorter than a length W2 of the shorter side of the rotating frame 131. Accordingly, when a portion of the rotating frame 131 is inserted into the insertion recess 151, the pair of fastening portions 150 support a portion of the rotating frame 131, and thus the display panel 110 may be prevented from being spaced apart from the rotating frame 131 in the third direction (Z-axis direction).

As the fastening portion 150 is provided on the rear surface BS of the display panel 110, as shown in FIG. 3A, the display panel 110 may be detachably attached to the rotating frame 131 in a sliding manner.

Meanwhile, as shown in FIG. 3A, the display panel 110 may further include a handle H.

The handle H is to easily remove the display panel 110 from the rotating frame 131 or easily couple the display panel 110 to the rotating frame 131. For example, the user may easily support the display panel 110 by holding the handle H. In addition, when the display panel 110 is pulled in a direction away from one side 131a of the rotating frame 131 while holding the handle H, the display panel 110 may be easily removed from the rotating frame 131. Conversely, while holding the handle H, the edge of the other side 131b of the rotating frame 131 may be inserted into the fastening portion 150, and then, the display panel 110 may be pushed in a direction toward the one side 131a of the rotating frame 131 so that the display panel 110 may be easily coupled to the rotating frame 131.

The handle H may be disposed on the edge of the other side 110b of the display panel 110 to have a stopper function of stopping the display panel 110 coupled to the rotating frame 131 so as not to move in a direction of one side 131a of the rotating frame 131 any longer.

In addition, as shown in FIG. 3B, the handle H is provided with a smaller size in the second direction (Y-axis direction) than the receiving recess 1331, so that when switching to the closed position is completed, the handle H may be inserted into the receiving recess 1331. In this case, the front surface US of the display panel 110 and the rear surface of the fixed frame 133 may be arranged in parallel in the first direction (X-axis direction). In addition, the handle H may be provided with a size smaller than the receiving recess 1331, so as to have a release preventing function to prevent the circuit unit, the battery, etc. disposed in the receiving recess 1331 from being released from the receiving recess 1331 due to impact or the like in case of the closed position.

Hereinafter, the link structure 135 of the display apparatus 100 according to an aspect of the present disclosure will be described in detail.

Figure 6A:
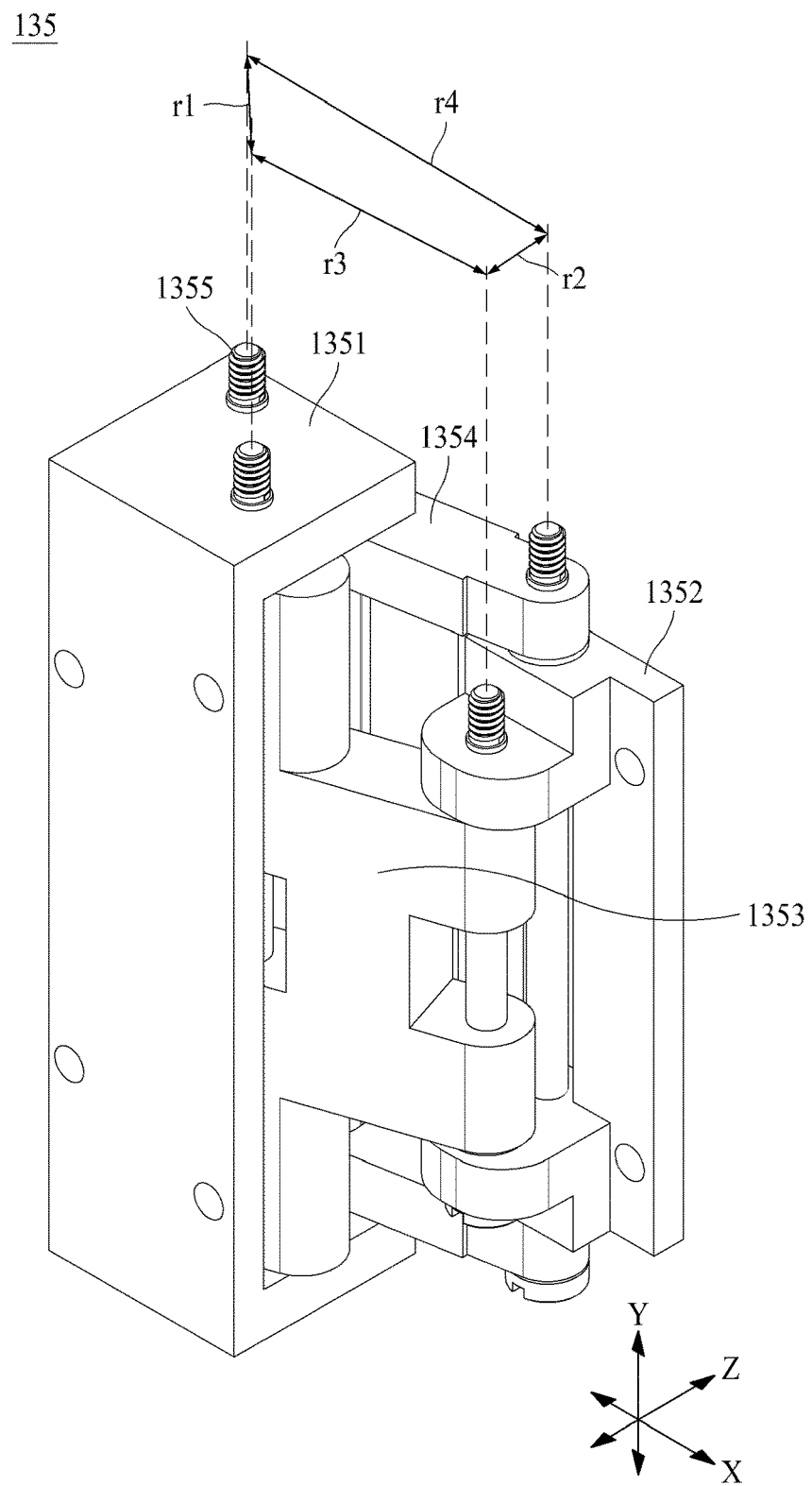
FIG. 6A is a schematic perspective view of a link structure of a display apparatus according to an aspect of the present disclosure.
Figure 6B:
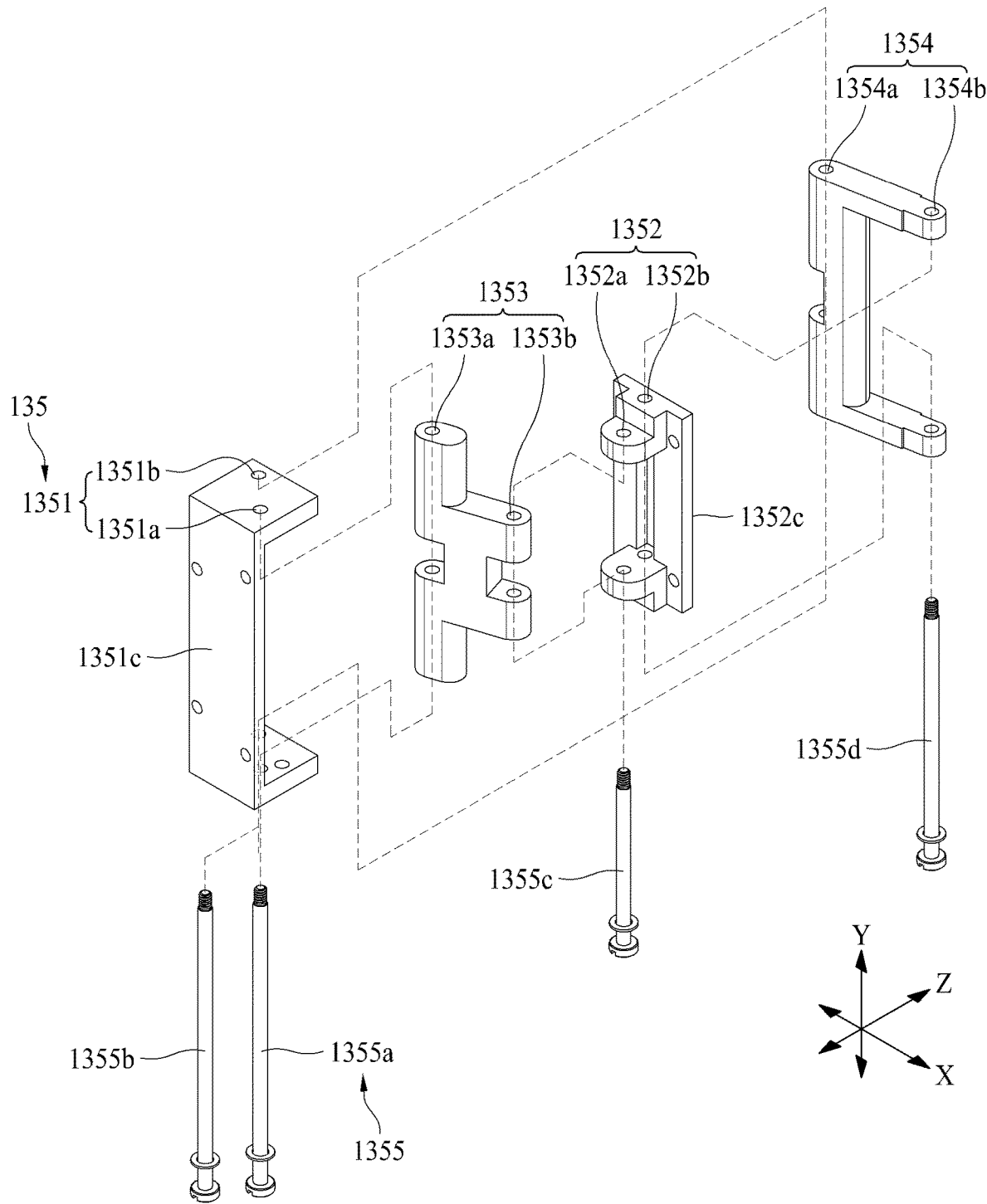
FIG. 6B is a schematic exploded perspective view of a link structure of FIG. 6A.
Figure 7:
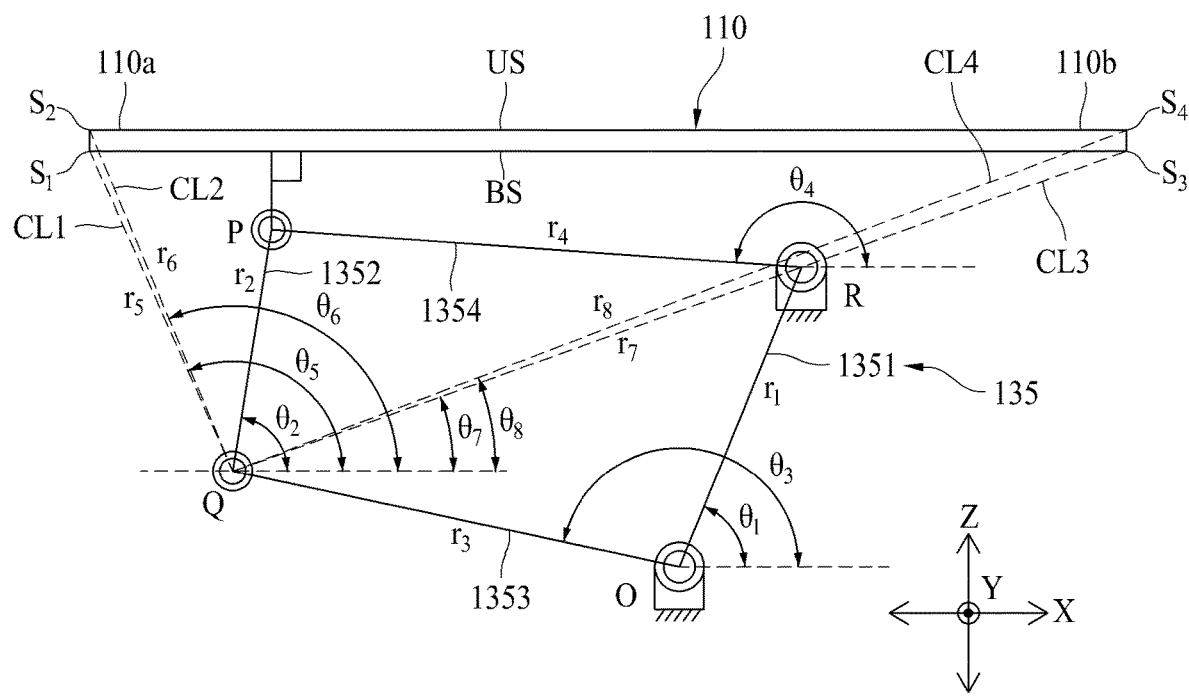
FIG. 7 is a bottom view schematically showing a link structure and a display panel of a display apparatus according to an aspect of the present disclosure.
Figure 8A:
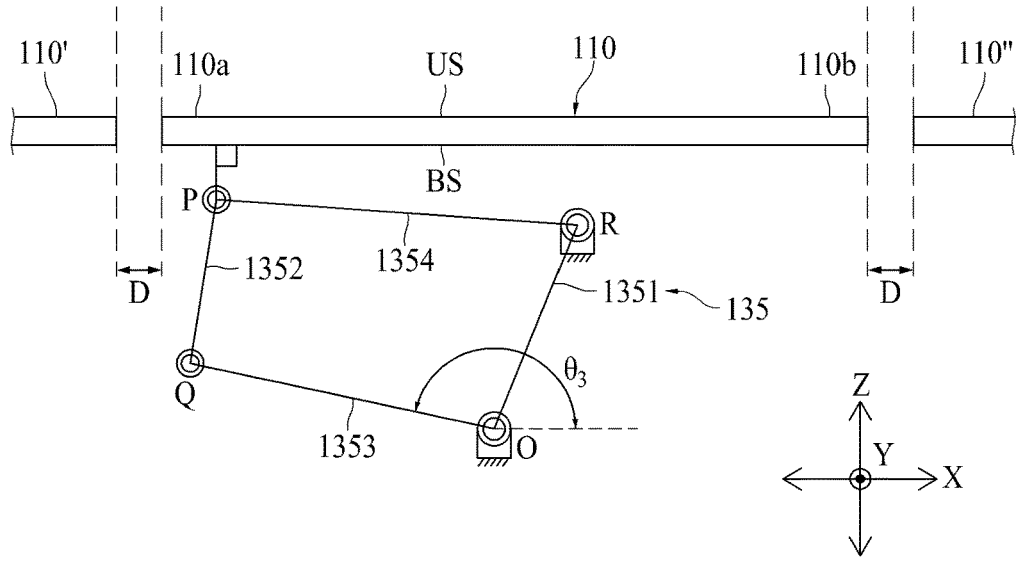
FIGS. 8A to 8C are schematic operation state diagrams illustrating transition from a closed position to an open position of a display apparatus according to an aspect of the present disclosure.
Figure 8B:
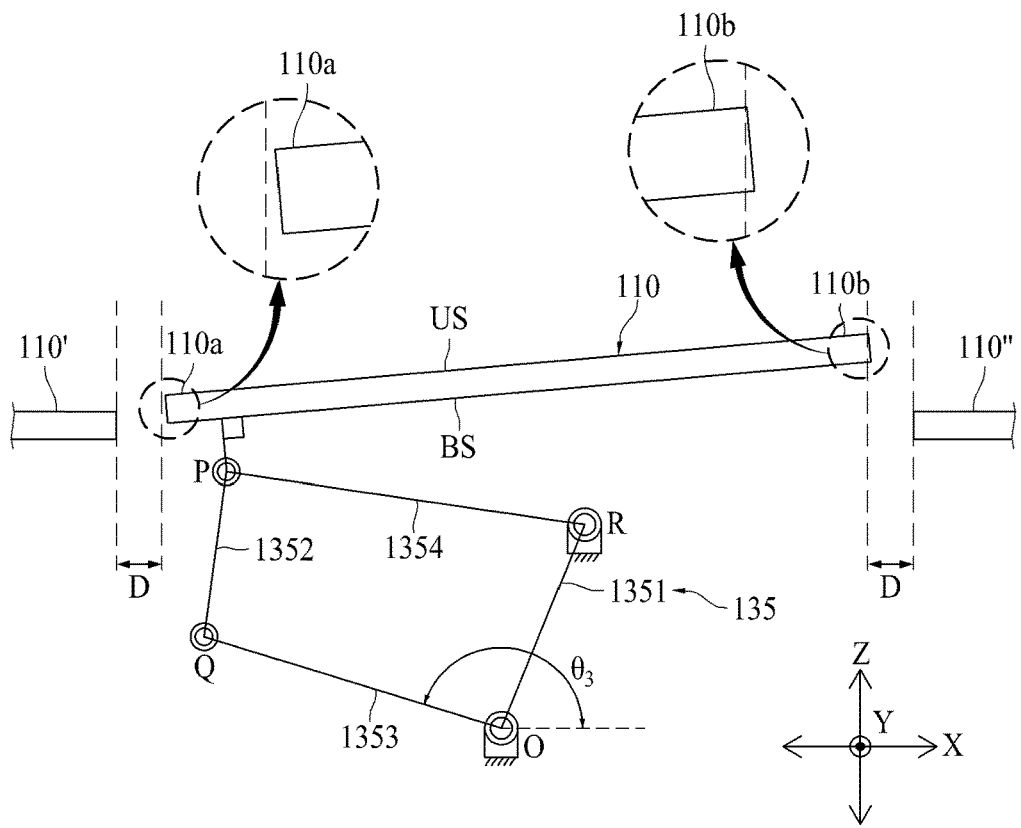
Figure 8C:
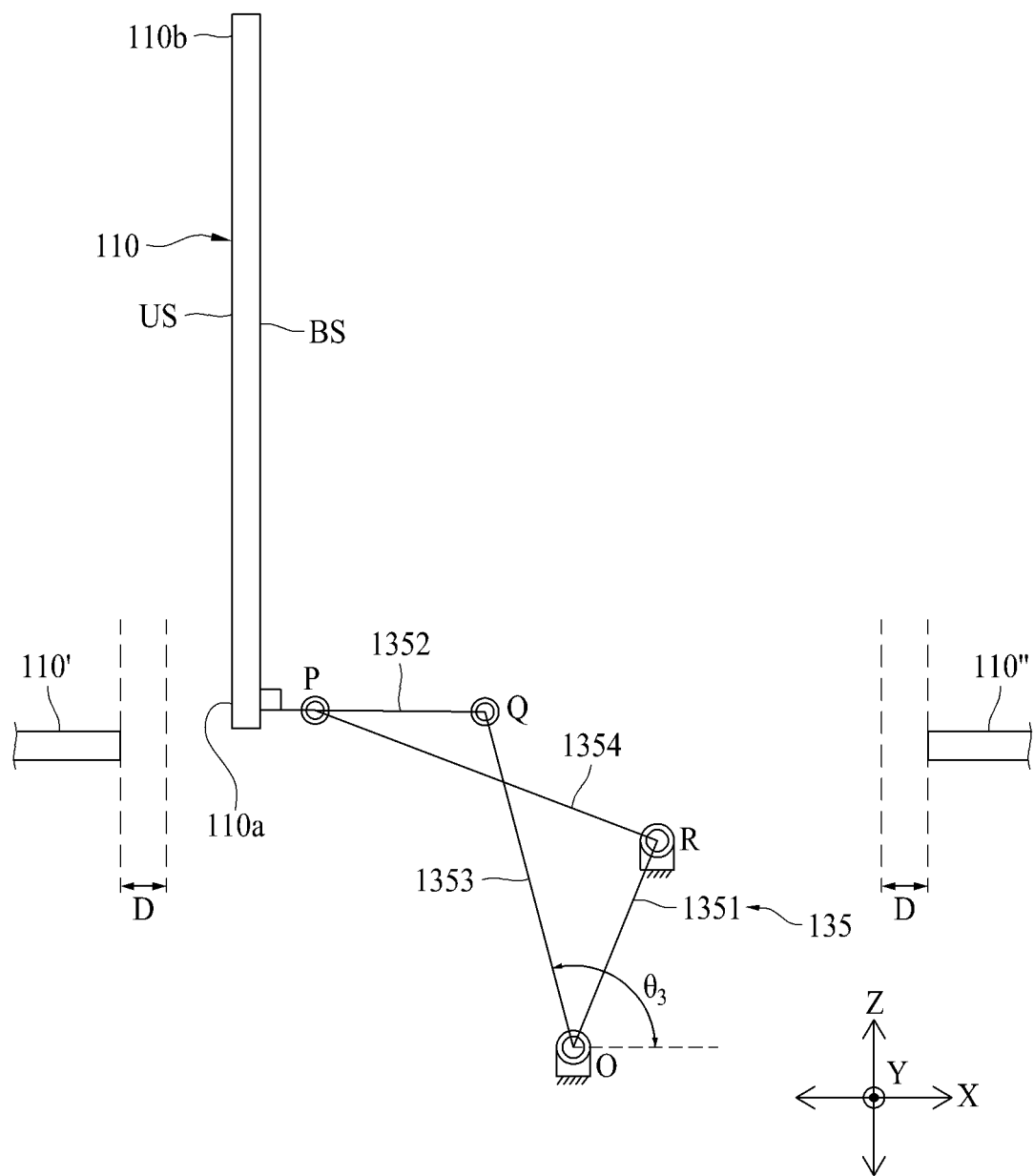

FIG. 6A is a schematic perspective view of a link structure of a display apparatus according to an aspect of the present disclosure, FIG. 6B is a schematic exploded perspective view of a link structure of FIG. 6A, FIG. 7 is a bottom view schematically showing a link structure and a display panel of a display apparatus according to an aspect of the present disclosure, and FIGS. 8A to 8C are schematic operation state diagrams illustrating transition from a closed position to an open position of a display apparatus according to an aspect of the present disclosure.

Referring to FIGS. 4 to 8C, the link structure 135 may include a first link member 1351, a second link member 1352, a third link member 1353, a fourth link member 1354, and a connection member 1355.

The first link member 1351 may be disposed on the fixed frame 133. The first link member 1351 may include a first side 1351a and a second side 1351b, and the first side 1351a may be placed to be closer to the fixed frame 133 than the second side 1351b. As shown in FIG. 6B, since a first coupling surface 1351c located on the first side 1351a of the first link member 1351 is coupled to the fixed frame 133, the first side 1351a and the second side 1351b of the first link member 1351 may be fixed to the fixed frame 133. The first side 1351a and the second side 1351b of the first link member 1351 may be disposed to be spaced apart by a first length r1, and in the present specification, the first length r1 is defined as a length of the first link member 1351.

The second link member 1352 may be disposed on the rotating frame 131. The second link member 1352 may include a first side 1352a and a second side 1352b, and the second side 1352b may be disposed to be closer to the rotating frame 131 than the first side 1352a. As shown in FIG. 6B, a second coupling surface 1352c positioned on the second side 1352b of the second link member 1352 may be coupled to the rotating frame 131. The first side 1352a and the second side 1352b of the second link member 1352 may be disposed to be spaced apart by a second length r2, and in the present specification, the second length r2 is defined as a length of the second link member 1352.

The third link member 1353 may be connected between the first side 1351a of the first link member 1351 and the first side 1352a of the second link member 1352. More specifically, the third link member 1353 may include the first side 1353a and the second side 1353b, and the first side 1353a may be rotatably coupled to the first side 1351a of the first link member 1351 and the second side 1353b may be rotatably coupled to the first side 1352a of the second link member 1352. The first side 1353a and the second side 1353b of the third link member 1353 may be disposed to be spaced apart from each other by a third length r3, and in the present specification, the third length r3 is defined as a length of the third link member 1353.

The fourth link member 1354 may be connected between the second side 1351b of the first link member 1351 and the second side 1352b of the second link member 1352. More specifically, the fourth link member 1354 may include a first side 1354a and a second side 1354b, and the first side 1354a may be rotatably coupled to the second side 1351b of the first link member 1351, and the second side 1354b may be rotatably coupled to the second side 1352b of the second link member 1352. The first side 1354a and the second side 1354b of the fourth link member 1354 may be disposed to be spaced apart by a fourth length r4, and in the present specification, the fourth length r4 is defined as a length of the fourth link member 1354.

The first length r1, the second length r2, the third length r3, and the fourth length r4 may refer to lengths of the first link member 1351, the second link member 1352, the third link member 1353, and the fourth link member 1354 on a plane passing through the X and Z axes with reference to FIG. 6A, respectively.

The connection member 1355 is to rotatably couple the first link member 1351, the second link member 1352, the third link member 1353, and the fourth link member 1354. The connection member 1355 may include a first connection member 1355a, a second connection member 1355b, a third connection member 1355c, and a fourth connection member 1355d.

The first connection member 1355a may rotatably connect the first side 1351a of the first link member 1351 and the first side 1353a of the third link member 1353 to each other.

The second connection member 1355b may rotatably connect the second side 1351b of the first link member 1351 and the first side 1354a of the fourth link member 1354 to each other.

The third connection member 1355c may rotatably connect the first side 1352a of the second link member 1352 and the second side 1353b of the third link member 1353 to each other.

The fourth connection member 1355d may rotatably connect the second side 1352b of the second link member 1352 and the second side 1354b of the fourth link member 1354 to each other.

As shown in FIG. 6B, the first side 1353a of the third link member 1353 may be located inside the first link member 1351, the second side 1353b of the third link member 1353 may be located inside the first side 1352a of the second link member 1352, the second side 1352b of the second link member 1352 may be located inside the second side 1354b of the fourth link member 1354, and the first side 1354a of the fourth link member 1354 may be located inside the second side 1351b of the first link member 1351. Accordingly, each of the second to fourth link members 1352, 1353, and 1354 may rotate around the first link member 1351 without interfering with each other.

In the display apparatus 100 according to an aspect of the present disclosure, a first value obtained by summing the first length r1 and the third length r3 may be smaller than a second value obtained by summing the second length r2 and the fourth length r4. That is, it may be provided to satisfy the following equation: r1+r3<r2+r4.

The reason why the length of each of the first to fourth link members 1351, 1352, 1353, and 1354 should satisfy the above conditions is because when the above conditions are met in the structure in which the first side 1351a and the second side 1351b of the first link member 1351 are fixed, that is, in a double locker structure, the display panel 110 is not interfered with the adjacent display panels 110', 110" shown in FIG. 8A) when the closed position is switched to the open position or when the open position is switched to the closed position.

If the equation such as r1+r3<r2+r4 is not satisfied, that is, if the length of each of the four link members is provided to satisfy r1+r3≥r2+r4, the display panel 110 for replacement, repair, or installation collides with the adjacent display panels 110' and 110", so that the display panel may be damaged. Alternatively, when the length of each of the four link members is provided to satisfy r1+r3≥r2+r4, the display panel is not inclined with respect to the fixed frame, and thus the display panel cannot be detached from the rotating frame.

As a result, in the display apparatus 100 according to an aspect of the present disclosure, the first value obtained by summing the first length r1 and the third length r3 is smaller than the second value obtained by summing the second length r2 and the fourth length r4, so that the display panel 110 may be easily attached to and detached from the rotating frame 131 without interfering with the adjacent display panels 110' and 110". This will be described once more with reference to FIGS. 8A to 8C.

As described above, in the double locker structure, the first to fourth link members 1351, 1352, 1353, and 1354 may be provided to satisfy the equation: r1+r3<r2+r4, and when this is viewed from the rear surface in the case of the closed position, as shown in FIG. 4, the first side 1352*a* and the second side 1352*b* of the second link member 1352 may be positioned on a first virtual line IL1 corresponding to a thickness direction of the display panel 110, and the first side 1351*a* and the second side 1351*b* of the first link member 1351 may be positioned on a second virtual line IL2 corresponding to a diagonal direction between the thickness direction and the longer side length direction of the display panel 110. Here, matching may include not only completely matching but also roughly matching.

Referring to FIG. 7, a connection portion between the first link member 1351 and the third link member 1353 is denoted by O, a connection portion between the third link member 1353 and the second link member 1352 is Q, a connection portion between the second link member 1352 and the fourth link member 1354 is P, a connection portion between the fourth link member 1354 and the first link member 1351 is R, an angle of the first link member 1351 with respect to the imaginary line passing through the O while parallel to the upper surface US of the display panel 110 in the closed position is a first angle $\theta 1$, an angle of the second link member 1352 with respect to the imaginary line passing through the Q while parallel to the upper surface US of the display panel 110 in the closed position is a second angle $\theta 2$, an angle of the third link member 1353 with respect to the imaginary line passing through the O while parallel to the upper surface US of the display panel 110 in the closed position is a third angle $\theta 3$, and an angle of the fourth link member 1354 with respect to the imaginary line passing through the R while parallel to the upper surface US of the display panel 110 in the closed position is a fourth angle $\theta 4$, the Q coordinate and the P coordinate may be Q=($r_3 \cos \theta_3$, $r_3 \sin \theta_3$ and P=($r_3 \cos \theta_3 + r_2 \cos \theta_2$, $r_3 \sin \theta_3 + r_2 \sin \theta_2$), respectively.

Here, the Q coordinate and the P coordinate may be coordinates based on O. That is, when the O coordinate is (0, 0), it may be a Q coordinate and a P coordinate.

In a four-bar link of a double locker structure that satisfies the equation such as r1+r3<r2+r4, when the display panel 110 is switched from the closed position to the open position or from the open position to the closed position, the coordinates of each of P and Q among the vertices of the link structure 135 will be converted by the above equation, so that an interval by which the display panel 110 is not interfered with the adjacent display panels 110' and 110" may be calculated.

Such a non-interference intervals (D, shown in FIG. 8A), which may be referred to as "a non-interference interval distance" as well) may also be calculated through vertices S1, S2, S3, S4 of the display panel 110 based on the thickness direction of the display panel 110, as shown in FIG. 7.

The S2 and S4 may be located on the upper surface US of the display panel 110, and the S1 and S3 may be located on the lower surface BS of the display panel 110. S2 may be located closer to P than S4, and S1 may be located closer to P than S3. That is, S1 and S2 may be located at the edge of one side 110*a* of the display panel 110 close to P, and S3 and S4 may be located at the edge of the other side 110*b* of the display panel 110 close to R.

Here, when a length of a first connection virtual line CL1 connecting Q to S1 is r5, a length of a second connection virtual line CL2 connecting Q to S2 is r6, a length of a third connection virtual line CL3 connecting Q to S3 is r7, a length of a fourth connection virtual line CL4 connecting Q to S4 is r8, an angle of the first connection virtual line CL1 with respect to a virtual line passing through Q while being parallel to the upper surface US of the display panel 110 in the closed position is a fifth angle $\theta 5$, an angle of the second connection virtual line CL2 with respect to the virtual line passing through Q while being parallel to the upper surface US of the display panel 110 in the closed position is a sixth angle $\theta 6$, an angle of the third connection virtual line CL3 with respect to the virtual line passing through Q while being parallel to the upper surface US of the display panel 110 in the closed position is a seventh angle $\theta 7$, and an angle of the fourth connection virtual line CL4 with respect to the virtual line passing through Q while being parallel to the upper surface US of the display panel 110 in the closed position is a fifth angle $\theta 8$, then the coordinates of S1, S2, S3, and S4 may be $S_1 = (r_3 \cos \theta_3 + r_5 \cos \theta_5, r_3 \sin \theta_3 + r_5 \sin \theta_5)$, $S_2 = (r_3 \cos \theta_3 + r_6 \cos \theta_6, r_3 \sin \theta_3 + r_6 \sin \theta_6)$, $S_3 = (r_3 \cos \theta_3 + r_7 \cos \theta_7, r_3 \sin \theta_3 + r_7 \sin \theta_7)$, and $S_4 = (r_3 \cos \theta_3 + r_8 \cos \theta_8, r_3 \sin \theta_3 + r_8 \sin \theta_8)$, respectively.

Here, the S1 coordinate, the S2 coordinate, the S3 coordinate, and the S4 coordinate may be coordinates based on Q. That is, they may be S1 coordinates, S2 coordinates, S3 coordinates, and S4 coordinates when the coordinates of Q are (0, 0).

In the four-bar link of the double locker structure that satisfies the equation such as r1+r3<r2+r4, when the display panel 110 is switched from the closed position to the open position or from the open position to the closed position by an external force, the coordinates of the vertices S1, S2, S3, and S4 of the display panel 110 may be converted by the above equation, and thus, an interval by which the display panel 110 is not interfered with the adjacent display panels 110' and 110" may be calculated therethrough.

As a result, in the display apparatus 100 according to an aspect of the present disclosure, the rotating frame 131 or the rotating frame 131 and the display panel 110 may be rotated through the four-bar link of the double locker structure satisfying the equation such as r1+r3<r2+r4 so as not to be interfered with the display panels 110' and 110", and thus, the display panel 110 may be easily attached to and detached from the rotating frame 131, thereby reducing a time of replacement, repair, or installation work.

In addition, in the display apparatus 100 according to an aspect of the present disclosure, the coordinates of the link member according to the rotation of the four-bar link having a double locker structure that satisfies the equation such as r1+r3<r2+r4 or the coordinates of the display panel 110 may be derived through the above equation, so that a plurality of display panels 110 may be arranged at the non-interference interval D by which the panels do not interfere with each other during replacement or installation work.

FIGS. 8A to 8C are schematic operation state diagram illustrating that when a plurality of display apparatuses 100 according to an aspect of the present disclosure are installed, the display panel 110 disposed between the adjacent display panels 110' and 110" is switched from the closed position to the open position.

FIG. 8A shows a state in which the display panel 110 is located in the closed position, in which the plurality of display panels 110', 110, and 110" are disposed to have the non-interference distance D in the first direction (X direction) on the plane passing through X axis and Y axis. For example, the non-interference distance D may be approximately 64 but is not necessarily limited thereto. The link structure 135 may be a four-bar link having a double locker structure that satisfies an equation such as r1+r3<r2+r4. As shown in FIG. 8A, in the closed state, the upper surfaces of each of the plurality of display panels 110', 110, and 110" may be arranged side by side on the X-axis.

FIG. 8B shows an initial state in which the display panel 110 is switched from a closed position to an open position by an external force. As the other side 110b of the display panel 110 is opened upward in the third direction (Z-axis direction), the second link member 1352 connected to the one side 110a of the display panel 110 may rise upward by a predetermined distance. Accordingly, the second side of each of the third link member 1353 and the fourth link member 1354 connected to the second link member 1352 may rise upward by a predetermined distance. As the second side of the third link member 1353 rises upward, the third angle θ3 of the third link member 1353 may be decreased than the third angle θ3 of FIG. 8A.

More specifically, referring to the movement of the other side 110b of the display panel 110 in FIG. 8B, a portion of the other side 110b of the display panel 110 may be moved by a predetermined distance toward the display panel 110" located on the right side. This is because the display panel 110 is connected to the four-bar link having a double locker structure that satisfies the equation such as r1+r3<r2+r4 and moves according to the movement of the four-bar link. As shown in FIG. 8B, since the other side 110b of the display panel 110 is moved upward than the display panel 110" located on the right side, the other side 110b of the display panel 110 may not be interfered with the display panel 110" located on the right side even if the other side 110b of the display panel 110 moves by a predetermined distance to the right side.

Also, the other side 110b of the display panel 110 may be moved to the right side only within a range not exceeding the non-interference interval D due to the four-bar link having a double locker structure that satisfies the equation 1+r3<r2+r4. For example, when the non-interference distance D is 64 μm, the moving distance to the right may be about 3.2 μm. When the non-interference interval D is provided to be 64 μm, the user does not sense that the display panels are spaced apart, and thus may view an image with a sense of unity.

As a result, in the initial state in which the display panel 110 is switched from the closed position to the open position, the other side 110b of the display panel 110 may be moved to the right by a predetermined distance, but moved by a distance smaller than the non-interference distance D due to the link structure 135, and since the other side 110b of the display panel 110 is moved upward than the right display panel 110", the display panel 110 may not be interfered with the right display panel 110".

Meanwhile, referring to the movement of one side 110a of the display panel 110 in FIG. 8B, one side 110a of the display panel 110 may be moved to the right by a predetermined distance because the other side 110b of the display panel 110 is moved by the link structure 135 to the right by a predetermined distance. In addition, one side 110a of the display panel 110 may be moved upward by a predetermined distance as the other side 110b of the display panel 110 rises. Accordingly, one side 110a of the display panel 110 may not interfere with the display panel 110' located on the left side.

FIG. 8C shows a state in which the display panel 110 is switched to the open position by an external force. As the display panel 110 is opened to substantially match the third direction (Z-axis direction), the third angle θ3 of the third link member 1353 may be further reduced compared to the third angle θ3 of FIG. 8B. In addition, the other side 110b of the display panel 110 may be located on the Z-axis and the one side 110a of the display panel 110. In this case, the end of the one side 110a of the display panel 110 may be located to be higher than or at the same height as the upper surface of the display panel 110' located on the left side due to the link structure 135 of the four-bar link having a double locker structure that satisfies the equation such as r1+r3<r2+r4. Also, since the display panel 110 may not move toward the display panel 110' located on the left due to the length limitation of the fourth link member 1354, the non-interference distance D may be maintained.

Therefore, the display panel 110 in the display apparatus 100 according to an aspect of the present disclosure does not interfere with the adjacent display panels 110' and 110" even when the display panel 110 is rotated to a degree substantially matching the Z-axis. Therefore, it is possible to easily attach and detach the display panel 110 to and from the rotating frame 131, thereby reducing replacement, repair, and installation work time.

Figure 9:
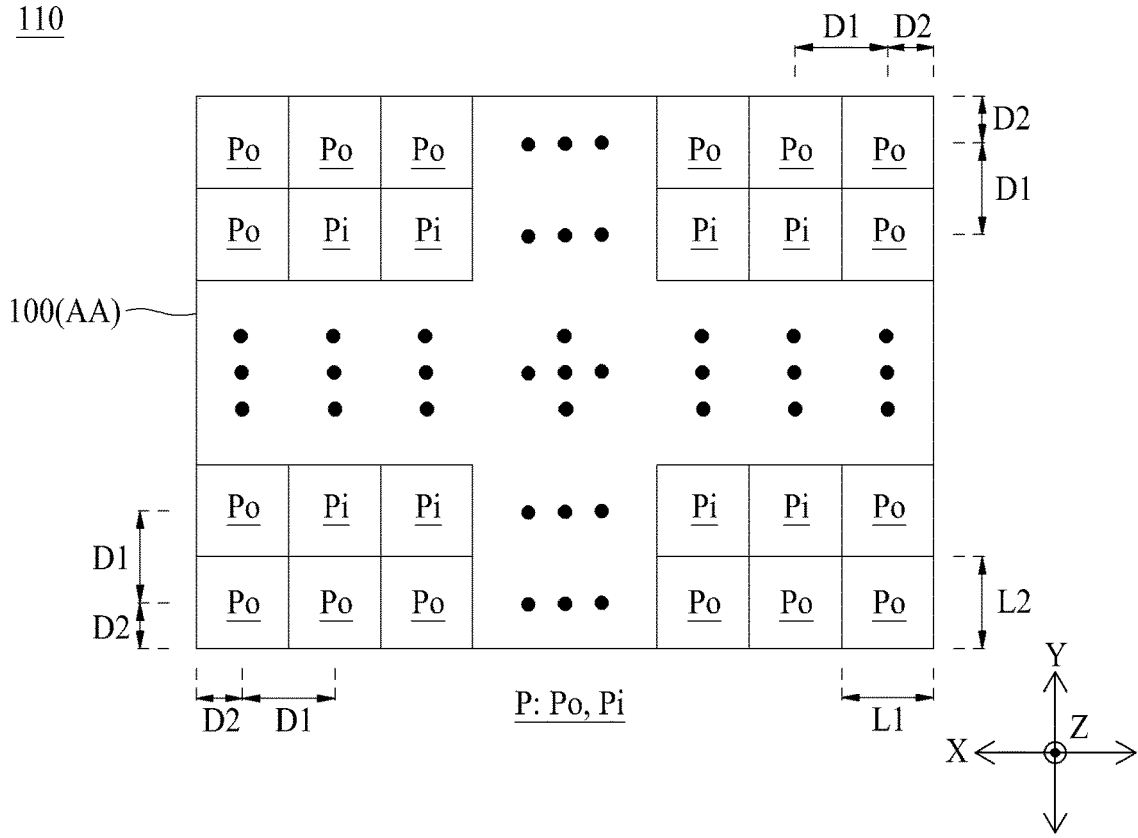
FIG. 9 is a schematic front view of a display apparatus according to an aspect of the present disclosure.
Figure 10:
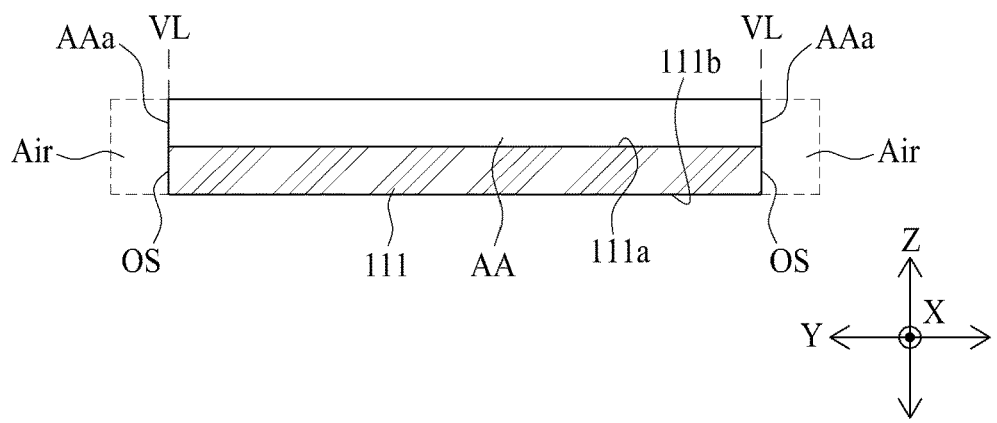
FIG. 10 is a schematic side view of a display apparatus according to an aspect of the present disclosure.
Figure 11A:
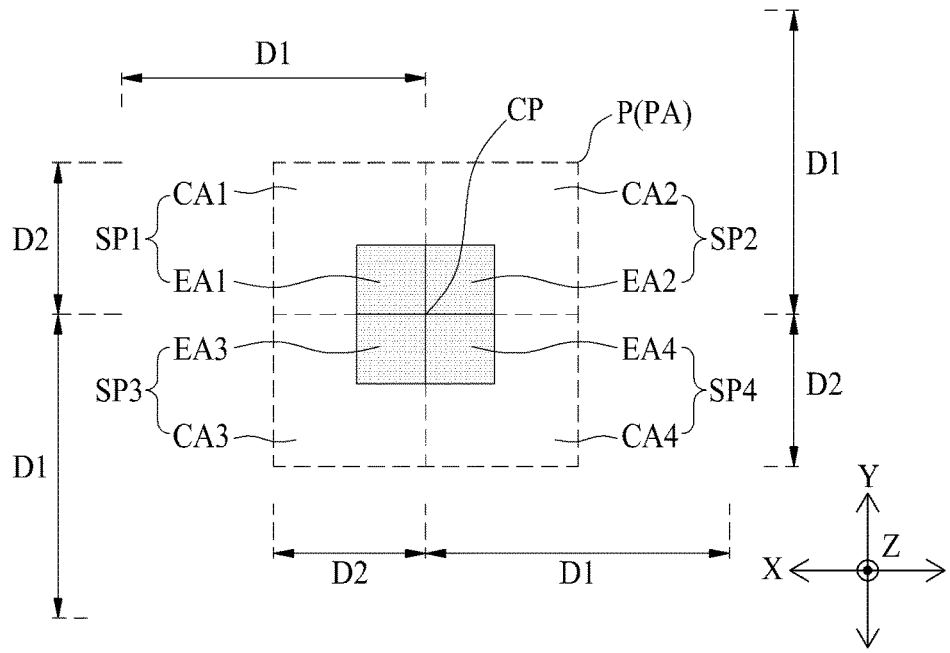
FIG. 11A is a diagram illustrating one pixel according to an example illustrated in FIG. 9.
Figure 11B:
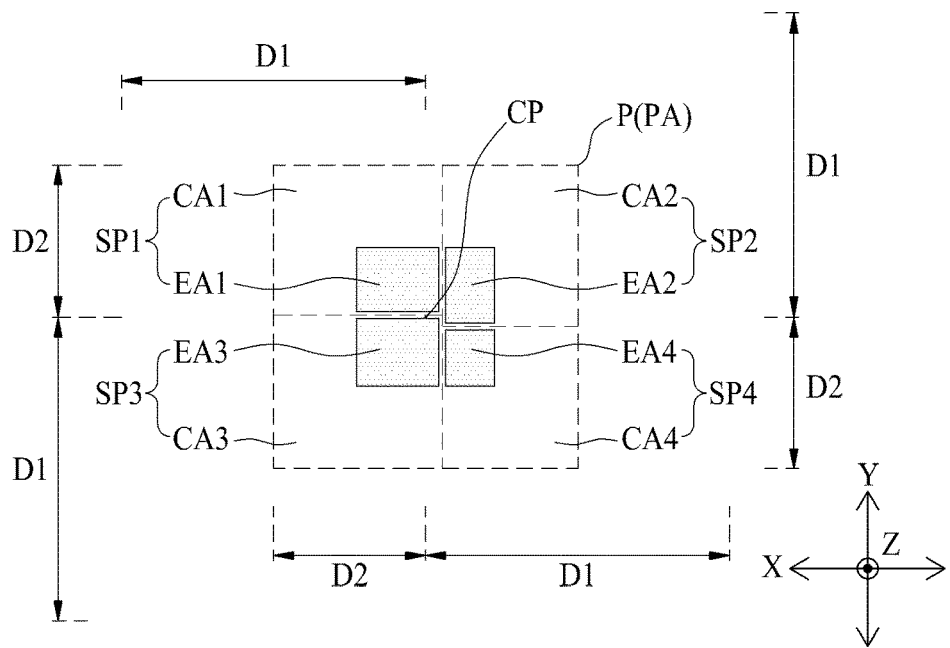
FIG. 11B is a diagram illustrating one pixel according to another example illustrated in FIG. 9.

FIG. 9 is a schematic front view of a display apparatus according to an aspect of the present disclosure, FIG. 10 is a schematic side view of a display apparatus according to an aspect of the present disclosure, FIG. 11A is a diagram illustrating one pixel according to an example illustrated in FIG. 9, and FIG. 11B is a diagram illustrating one pixel according to another example illustrated in FIG. 9.

Referring to FIGS. 9 and 10, in the display apparatus 100 according to an aspect of the present disclosure, the display panel 110 may include a substrate 111 and a plurality of pixels P formed in a display portion AA (which is an example of a display unit or a part of the display unit) on the substrate 111.

The substrate 111 may be expressed as a first substrate, a base substrate, or a pixel array substrate. For example, the substrate 111 may be a glass substrate, a bendable thin glass substrate, or a plastic substrate.

The substrate 111 according to an example may include a first surface 111a, a second surface 111b, and an outer surface OS. The first surface 111a of the substrate 111 may be defined as a front surface, an upper surface, or an upper side surface facing the front of the display apparatus. Here, the first surface 111a of the substrate 111 may be the front surface US of the display panel 110. The second surface 111b of the substrate 111 may be defined as a back surface, a rear surface, a lower surface, or a lower side surface facing the rear of the display apparatus. Here, the second surface 111b of the substrate 111 may be the rear surface BS of the display panel 110. The outer surface OS of the substrate 111 may be defined as a side, a side surface, or a side wall exposed to the air while facing a lateral surface of the display apparatus.

The display portion AA may be expressed an area where an image is displayed and may be expressed as an active portion, an active region, or a display region. A size of the display portion AA may be the same as the size of the substrate 111 (or display apparatus). For example, the size of the display portion AA may be the same as the overall size of the first surface 111a of the substrate 111. Accordingly, the display portion AA is implemented (or disposed) on the entire front surface of the substrate 111 so that the substrate 111 does not include a non-display region which is provided along the edge of the first surface 111a to surround the entire display portion AA. Accordingly, the entire front surface of the display apparatus may implement the display portion AA.

The end (or outermost) AAa of the display portion AA may overlap an outer surface OS of the substrate 111 or may be aligned with the outer surface OS of the substrate 111. For example, based on the thickness direction (third direction (Z-axis direction)) of the display apparatus, the lateral surface AAa of the display portion AA may be aligned with an extended vertical extension line VL perpendicular to the outer surface OS of the substrate 111. The lateral surface AAa of the display portion AA may be surrounded only by air without being surrounded by a separate mechanism. That is, all of the lateral surfaces AAa of the display portion AA may have a structure in direct contact with air without being surrounded by a separate mechanism. Accordingly, since the outer surface OS of the substrate 111 corresponding to the end AAa of the display portion AA is surrounded only by air, the display apparatus 100 according to the aspect of the present disclosure may have an air-bezel structure in which the end AAa of the display portion AA is surrounded by air instead of an opaque non-display region or a structure without a bezel.

The plurality of pixels P may be arranged (or disposed) to have a first interval D1 on the display portion AA of the substrate 111 in each of the first direction (X-axis direction) and the second direction (Y-axis direction). The first direction (X-axis direction) may be a horizontal direction, or a first longitudinal direction (e.g., a horizontal longitudinal direction) of the substrate 111 or the display apparatus. The second direction (Y-axis direction) may be a vertical direction or may be a second longitudinal direction (e.g., a vertical longitudinal direction) of the substrate 111 or the display apparatus.

Each of the plurality of pixels P may be implemented in a plurality of pixel regions defined on the display portion AA of the substrate 111. Each of the plurality of pixel regions may have a first length L1 parallel to the first direction (X-axis direction) and a second length L2 parallel to the second direction (Y-axis direction). The first length L1 may be equal to the second length L2 or may be equal to the first interval D1. Each of the first length L1 and the second length L2 may be equal to the first interval D1. Accordingly, the plurality of pixels P may all have the same size. For example, the first length L1 may be expressed as a first width, a horizontal length, or a horizontal width. The second length L2 may be expressed as a second width, a vertical length, or a vertical width.

Two pixels P adjacent in each of the first direction (X-axis direction) and the second direction (Y-axis direction) may have the same first interval D1 (which may be referred to as first distance D1 as well) within an error range in the manufacturing process. The first interval D1 may be a pitch (or pixel pitch) between two adjacent pixels P. For example, the first distance D1 may be the shortest distance (or the shortest length) between the centers of each of the two adjacent pixels P. Optionally, the pixel pitch may be a size between one end and the other end of the pixel P parallel to the first direction (X-axis direction). Also, in another example, the pixel pitch may be expressed as a size between one end and the other end of the pixel P parallel to the second direction (Y-axis direction).

Each of the plurality of pixels P may include a circuit layer including a pixel circuit implemented in a pixel region on the substrate 111 and a light emitting device layer disposed on the circuit layer and connected to the pixel circuit. The pixel circuit outputs a data current corresponding to a data signal in response to a data signal and a scan signal supplied from pixel driving lines disposed in the pixel region. The light emitting device layer may include a light emitting layer that emits light by the data current supplied from the pixel circuit.

The plurality of pixels P may be divided into outermost pixels Po and internal pixels Pi.

The outermost pixels Po (or the first pixels) may be pixels disposed closest to the outer surface OS of the substrate 111 among the plurality of pixels P. For example, the outermost pixels Po may be expressed as first pixels.

The second distance D2 (which may be referred to as second interval D2 as well) between the center of the outermost pixels Po and the outer surface OS of the substrate 111 may be half or less than half the first distance D1. For example, the second distance D2 may be the shortest distance (or the shortest length) between the center of the outermost pixels Po and the outer surface OS of the substrate 111.

When the second interval D2 exceeds half of the first interval D1, the substrate 111 have a larger size than the display portion AA by a difference between the half of the first interval D1 and the second interval D2, and therefore, the region between the end of the outermost pixel Po and the outer surface OS of the substrate 111 may be configured as a non-display region surrounding the entire display portion AA. For example, when the second interval D2 exceeds half of the first interval D1, the substrate 111 inevitably includes a bezel region according to the non-display region surrounding the entire display region AA. Therefore, when the plurality of display panels 110 are disposed adjacent to each other, the sum of the second intervals D2 of the two substrates 111 is greater than the first interval D1, so that the sum of the second intervals D2 of the two substrates 111 is greater than the sum (or seam) of the bezel region of each substrate 111 and may be recognized by the user.

Meanwhile, when the second interval D2 is half or less than half the first interval D1, the end of the outermost pixel Po may be aligned with the outer surface OS of the substrate 111 or the end AAa of the display portion AA may be aligned with the outer surface OS of the substrate 111, and thus the display portion AA may be implemented (or disposed) on the entire surface of the substrate 111. Accordingly, even if a plurality of display panels 110 according to an aspect of the present disclosure are disposed adjacently, a seam may not be recognized by a user.

The internal pixels Pi may be pixels other than the outermost pixels Po among the plurality of pixels P or pixels surrounded by the outermost pixels Po among the plurality of pixels P. The internal pixels Pi may be represented by second pixels. These internal pixels Pi may be implemented in a configuration or structure different from that of the outermost pixel Po.

Referring to FIGS. 9 and 11A, one pixel P according to an aspect of the present disclosure may include first to fourth sub-pixels SP1, SP2, SP3, and SP4 disposed in the pixel region PA.

The first sub-pixel SP1 may be disposed in a first sub-pixel region of the pixel region PA, the second sub-pixel SP2 may be disposed in a second sub-pixel region of the pixel region PA, the third subpixel SP3 may be disposed in a third subpixel region of the pixel region PA, and the fourth subpixel SP4 may be disposed in a fourth subpixel region of the pixel region PA.

As an example, the first subpixel SP1 may be implemented to emit light of a first color, the second subpixel SP2 may be implemented to emit light of a second color, the third subpixel SP3 may be implemented to emit light of a third color, and the fourth sub-pixel SP4 may be implemented to emit light of the fourth color. Each of the first to fourth colors may be different. For example, the first color may be red, the second color may be blue, the third color may be white, and the fourth color may be green.

As another example, some of the first to fourth colors may be the same. For example, the first color may be red, the second color may be first green, the third color may be second green, and the fourth color may be blue.

Each of the first to fourth sub-pixels SP1, SP2, SP3, and SP4 may include light emitting region EA1, EA2, EA3, and EA4 and circuit regions CA1, CA2, CA3, and CA4.

The light emitting regions EA1, EA2, EA3, and EA4 may be disposed to be shifted toward the center CP of the pixel P in the sub-pixel region. For example, the light emitting regions EA1, EA2, EA3, and EA4 may be expressed as an opening region, an opening, or a light emitting portion.

According to an example, the light emitting regions EA1, EA2, EA3, and EA4 of the first to fourth sub-pixels SP1, SP2, SP3, and SP4 may have the same size. For example, each of the light emitting regions EA1, EA2, EA3, and EA4 of the first to fourth subpixels SP1, SP2, SP3, and SP4 may have a uniform quad structure or a uniform stripe structure. For example, the light emitting regions EA1, EA2, EA3, and EA4 having a uniform quad structure or a uniform stripe structure may have a size smaller than a quadrant size of the pixel P and may be disposed to be shifted toward CP in the sub-pixel region or may be disposed to be concentrated in the central portion CP of the pixel P.

Referring to FIGS. 9 and 11B, the light emitting regions EA1, EA2, EA3, and EA4 of the first to fourth subpixels SP1, SP2, SP3, and SP4 according to another example may have different sizes. For example, each of the light emitting regions EA1, EA2, EA3, and EA4 of the first to fourth subpixels SP1, SP2, SP3, and SP4 may have a non-uniform quad structure or a non-uniform stripe structure.

The size of each of the first to fourth sub-pixels SP1, SP2, SP3, and SP4 having a non-uniform quad structure (or a non-uniform stripe structure) may be set according to resolution, luminous efficiency, or image quality. As an example, when the light emitting regions EA1, EA2, EA3, and EA4 have an unequal quad structure (or unequal stripe structure), the light emitting region EA4 of the fourth subpixel SP4, among the light emitting regions EA1, EA2, EA3, and EA4 of the first to fourth subpixels SP1, SP2, SP3, and SP4 may have the smallest size, and the light emitting region EA3 of the third subpixel SP3 may have the largest size. For example, the light emitting regions EA1, EA2, EA3, and EA4 having a non-uniform quad structure (or a non-uniform stripe structure) may be concentrated around the central portion CP of one pixel P. In one pixel P (or pixel region PA), the central portions of the light emitting regions EA1, EA2, EA3, and EA4 are aligned with the central portion CP of the pixel P or spaced apart from the central portion CP of the pixel P.

The circuit regions CA1, CA2, CA3, and CA4 of each of the first to fourth sub-pixels SP1, SP2, SP3, and SP4 may be disposed around the corresponding light emitting regions EA1, EA2, EA3, and EA4. The circuit regions CA1, CA2, CA3, and CA4 may include a circuit for a corresponding sub-pixel and pixel driving lines. For example, the circuit regions CA1, CA2, CA3, and CA4 may be expressed as a non-light-emitting region, a non-opening region, a non-light-emitting portion, a non-opening portion, or a peripheral portion.

Alternatively, in order to increase an aperture ratio of the sub-pixels SP1, SP2, SP3, and SP4 corresponding to the size of the light emitting regions EA1, EA2, EA3, and EA4 or to reduce a pixel pitch D1 according to high resolution of the pixel P, the light emitting regions EA1, EA2, EA3, and EA4 of each of the first to fourth sub-pixels SP1, SP2, SP3, and SP4 may be extended onto the circuit regions CA1, CA2, CA3, and CA4 so as to overlap some or all of the circuit regions CA1, CA2, CA3, and CA4. For example, the light emitting regions EA1, EA2, EA3, and EA4 of each of the first to fourth subpixels SP1, SP2, SP3 and SP4 may be implemented on the substrate 111 to overlap the corresponding circuit regions CA1, CA2, CA3, and CA4. In this case, the light emitting regions EA1, EA2, EA3, and EA4 may have a size which is the same as or larger than the circuit regions CA1, CA2, CA3, or CA4.

Alternatively, each of the plurality of pixels P according to another example may include first to third sub-pixels SP1, SP2, and SP3.

The light emitting regions EA1, EA2, and EA3 of each of the first to third sub-pixels SP1, SP2, and SP3 may have a rectangular shape having a shorter side parallel to the first direction (X-axis direction) and a longer side parallel to the second direction (Y-axis direction) and may be arranged, for example, in a 1×3 shape or a 1×3 stripe shape. For example, the first subpixel SP1 may be a red subpixel, the second subpixel SP2 may be a blue subpixel, and the third subpixel SP3 may be a green subpixel.

Figure 12:
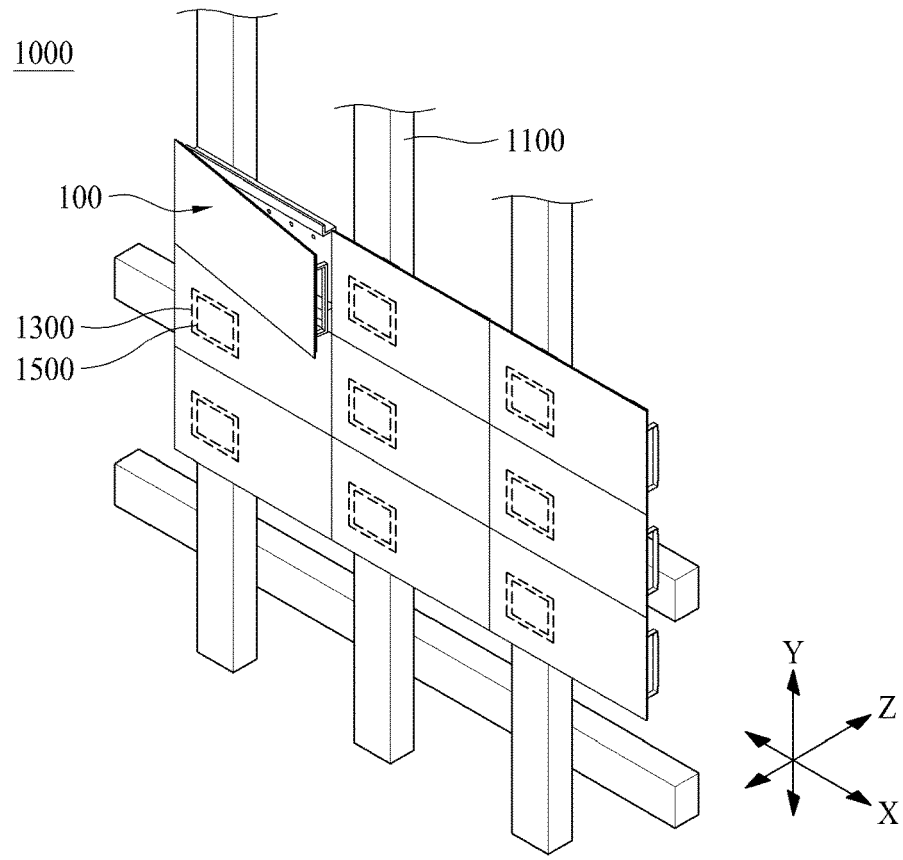
FIG. 12 is a schematic perspective view of a tiled display apparatus according to an aspect of the present disclosure.
Figure 13:
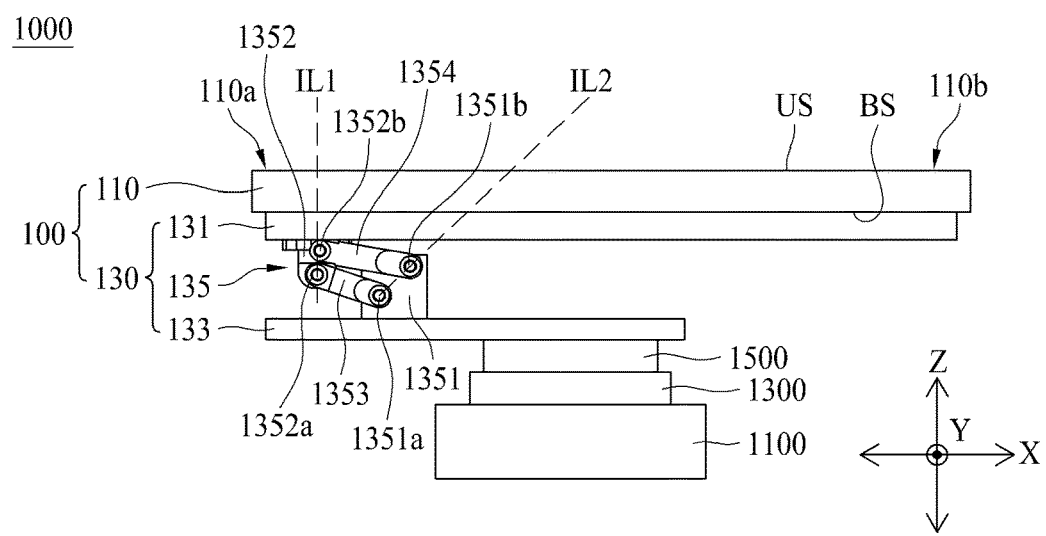
FIG. 13 is a schematic bottom view of a tiled display apparatus according to an aspect of the present disclosure.

FIG. 12 is a schematic perspective view of a tiled display apparatus according to an aspect of the present disclosure, and FIG. 13 is a schematic bottom view of a tiled display apparatus according to an aspect of the present disclosure.

Referring to FIGS. 12 and 13, the tiled display apparatus 1000 according to an aspect of the present disclosure may include a stand frame 1100, a plurality of support brackets 1300, a plurality of positioning modules 1500, and a plurality of display apparatuses 100 of FIGS. 1 to 11B.

The stand frame 1100 is supported on a floor or a wall to support the display apparatus 100. As shown in FIG. 12, the stand frame 1100 may include a plurality of first frames arranged in the first direction (X-axis direction) (or horizontal direction) and a plurality of second frames arranged in the second direction (Y-axis direction) (or vertical direction).

The plurality of first frames may be disposed parallel to each other in the first direction (X-axis direction) and spaced apart from each other in the second direction (Y-axis direction). The plurality of second frames may be disposed parallel to each other in the second direction (Y-axis direction) and spaced apart from each other in the first direction (X-axis direction). The plurality of first frames and the plurality of second frames may be coupled to each other to cross each other, so that a bearing force for supporting the plurality of display apparatuses 100 may be improved.

The plurality of first frames and the plurality of second frames may be each formed of a metal material to support the plurality of display apparatuses 100, but are not limited thereto, and the plurality of first frames and the plurality of second frames may be formed of any other material as long as it may support the plurality of display apparatuses 100.

The plurality of support brackets 1300 may be disposed on the stand frame 1100. The plurality of support brackets 1300 according to an example may be coupled to the second frame and disposed to be spaced apart from each other in the second direction (Y-axis direction). Here, a distance by which the plurality of support brackets 1300 are spaced apart from each other may be equal to or greater than the length of the shorter side of the display apparatus 100 (or the display panel 110). If the distance by which the plurality of support brackets 1300 are spaced apart from each other is smaller than the length of the shorter side of the display apparatus 100 (or the display panel 110), the edges of the plurality of display apparatuses 100 (or the display panel 110) may overlap each other, so that they cannot be coupled to the stand frame 1100 or the display apparatus 100 (or the display panel 110) may be damaged.

As another example, the plurality of support brackets 1300 may be coupled to the first frame. In this case, the plurality of support brackets 1300 may be disposed to be spaced apart from each other in the first direction (X-axis direction), and the distance by which the plurality of support brackets 1300 are spaced apart from each other may be equal to or greater than the length of the longer side the display apparatus 100 (or the display panel 110).

Each of the plurality of support brackets 1300 may be fixed to the first frame or the second frame through bolt coupling or the like. Accordingly, a rear surface of each of the plurality of support brackets 1300 may be in contact with the first frame or the second frame.

The plurality of positioning modules 1500 may be connected to a plurality of support brackets 1300, respectively. For example, each of the plurality of positioning modules 1500 may be connected to a corresponding one of the plurality of support brackets 1300, but the present disclosure is not limited thereto. For example, at least one of the plurality of positioning modules 1500 may be connected to two or more of the plurality of support brackets 1300. The plurality of positioning modules 1500 are to adjust the positions of each of the plurality of display apparatuses 100 that are coupled, respectively, and may be coupled to the front surface of the support bracket 1300 as shown in FIG. 13. A plurality of display apparatuses 100 may be coupled (or tiled) to the front surface of the plurality of positioning modules 1500, respectively, and more specifically, to the fixed frame 133 of the support module 130. For example, each of the plurality of display apparatuses 100 may be coupled (or tiled) to the front surface of a corresponding one of the plurality of positioning modules 1500, but the present disclosure is not limited thereto. For example, at least one of the plurality of display apparatuses 100 may be coupled (or tiled) to front surfaces of two or more of the plurality of positioning modules 1500.

The positioning module 1500 is to move the display apparatus 100 in different three-axis directions, that is, the first direction (X-axis direction), the second direction (Y-axis direction), and the third direction (Z-axis direction) with respect to the support bracket 1300. That is, the positioning module 1500 may be positioned between the support bracket 1300 and the display apparatus 100 to rotate a plurality of positioning members such as bolts, thereby adjusting the position of the display apparatus 100 in three different three-axis directions.

Therefore, in the tiled display apparatus 1000 according to an aspect of the present disclosure, the plurality of display apparatuses 100 may be coupled to the stand frame 1100 through the plurality of support brackets 1300 and the plurality of positioning modules 1500, and in particular, since the position of each of the plurality of display apparatuses 100 may be adjusted through a corresponding positioning module 1500 coupled to each of the plurality of display apparatuses 100, it is possible to more effectively prevent the plurality of display apparatus 100 from interfering with each other during replacement, repair, or installation, and realize a unified image.

The display apparatus according to the present disclosure is provided to rotate the rotating frame with respect to the fixed frame through the link structure disposed between the fixed frame and the rotating frame, so that the display panel may be easily attached to and detached from the rotating frame, thereby shortening replacement, repair, or installation work time for the display panel.

In the tiled display apparatus according to the present disclosure, a plurality of display apparatuses may be disposed not to interfere with each other through the link structure formed as a four-bar link during replacement or installation, thereby shortening the replacement and installation work time.

In the tiled display apparatus according to the present disclosure, since the position of each of the plurality of display apparatuses may be moved in the three-axis direction through a corresponding positioning module of the plurality of positioning modules coupled to the stand frame, the plurality of display apparatuses may be provided to output an image having a sense of unity.

The above-described feature, structure, and effect of the present disclosure are included in at least one aspect of the present disclosure, but are not limited to only one aspect. Furthermore, the feature, structure, and effect described in at least one aspect of the present disclosure may be implemented through combination or modification of other aspects by those skilled in the art. Therefore, content associated with the combination and modification should be construed as being within the scope of the present disclosure.

It will be apparent to those skilled in the art that various modifications and variations may be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A display apparatus comprising:
   a display panel and a support module configured to support the display panel,
   wherein the support module includes:
   a rotating frame configured to support the display panel;
   a fixed frame configured to support the rotating frame; and
   a link structure disposed between the fixed frame and the rotating frame and configured to rotate the rotating frame through at least four-bar link structure,
   wherein the rotating frame includes a magnetic portion having magnetism, and at least a portion of the fixed frame includes a metal material, and
   wherein the magnetic portion is disposed in the rotating frame to correspond to a portion of the fixed frame including the metal material.

2. The display apparatus of claim 1, wherein the link structure is disposed between one edge portion of the fixed frame and one edge portion of the rotating frame.

3. The display apparatus of claim 1, wherein the link structure includes:
   a first link member disposed at the fixed frame;
   a second link member disposed at the rotating frame;
   a third link member connected between a first side of the first link member and a first side of the second link member; and a fourth link member connected between a second side of the first link member and a second side of the second link member.

4. The display apparatus of claim 3, wherein, in the second link member, the first side and the second side are positioned on a first virtual line corresponding to a thickness direction of the display panel, and wherein, in the first link member, the first side and the second side are positioned on a second virtual line corresponding to a diagonal direction between the thickness direction and a length direction of the display panel.

5. The display apparatus of claim 1, further comprising:
a pair of fastening portions spaced apart from each other on a rear surface of the display panel,
wherein each of the pair of fastening portions includes an insertion recess allowing a portion of the rotating frame to be inserted therein.

6. The display apparatus of claim 5, wherein a length by which the pair of fastening portions are spaced apart from each other is shorter than a length of a shorter side of the rotating frame.

7. The display apparatus of claim 1, wherein the display panel is detachably attached to the rotating frame in a sliding manner.

8. The display apparatus of claim 1, wherein the fixed frame includes a receiving recess receiving a circuit portion.

9. The display apparatus of claim 3, wherein the first side and the second side of the first link member are fixed,
the third link member is coupled to the first side of the first link member so as to be rotatable with respect to the first side of the first link member,
the fourth link member is coupled to the second side of the first link member so as to be rotatable with respect to the second side of the first link member, and
the second link member is rotatably coupled to each of the third link member and the fourth link member.

10. The display apparatus of claim 3, wherein the display panel is positioned in a closed position parallel to the fixed frame or an open position inclined with respect to the fixed frame.

11. The display apparatus of claim 10, wherein, when a length of the first link member is r1,
a length of the second link member is r2,
a length of the third link member is r3,
a length of the fourth link member is r4, and
a first value obtained by summing up r1 and r3 is smaller than a second value obtained by summing up r2 and r4.

12. The display apparatus of claim 11, wherein, when a connection portion of the first link member and the third link member is O,
a connection portion of the third link member and the second link member is Q,
a connection portion of the second link member and the fourth link member is P,
a connection portion of the fourth link member and the first link member is R,
an angle of the first link member with respect to a virtual line passing through O, while being parallel to an upper surface of the display panel in the closed position, is θ1,
an angle of the second link member with respect to a virtual line passing through Q, while being parallel to an upper surface of the display panel in the closed position, is θ2,
an angle of the third link member with respect to a virtual line passing through O, while being parallel to an upper surface of the display panel in the closed position, is θ3, and
an angle of the fourth link member with respect to a virtual line passing through R, while being parallel to an upper surface of the display panel in the closed position, is θ4,
Q coordinates and P coordinates are Q=($r_3$ cos θ$_3$, $r_3$ sin θ$_3$) and P=($r_3$ cos θ$_3$+$r_2$ cos θ$_2$, $r_3$ sin θ$_3$+$r_2$ sin θ$_2$), respectively.

13. The display apparatus of claim 12, wherein vertices of the display panel based on a thickness direction of the display panel are S1, S2, S3, and S4,
S2 and S4 are positioned on an upper surface of the display panel,
S1 and S3 are positioned on a lower surface of the display panel,
S2 is closer to P than S4, and
S1 is closer to P than S3.

14. The display apparatus of claim 13, wherein S1 and S2 are positioned on one side of the display panel, S3 and S4 are positioned on the other side of the display panel, and
when the display panel rotates from the closed position to the open position, S1 and S2 are not interfered with a display panel adjacent to one side of the display panel and S3 and S4 are not interfered with a display panel adjacent to the other side of the display panel.

15. The display apparatus of claim 13, wherein, when a length of a first connection virtual line connecting from Q to S1 is r5,
a length of a second connection virtual line connecting from Q to S2 is r6,
a length of a third connection virtual line connecting from Q to S3 is r7,
a length of a fourth connection virtual line connecting from Q to S4 is r8,
an angle of the first connection virtual line with respect to a virtual line passing through Q, while being parallel to the upper surface of the display panel, in the closed position is θ5,
an angle of the second connection virtual line with respect to the virtual line passing through Q, while being parallel to the upper surface of the display panel, in the closed position is θ6,
an angle of the third connection virtual line with respect to the virtual line passing through Q, while being parallel to the upper surface of the display panel, in the closed position is θ7, and
an angle of the fourth connection virtual line with respect to the virtual line passing through Q, while being parallel to the upper surface of the display panel, in the closed position is θ8,
coordinates of S1, coordinates of S2, coordinates of S3, and coordinates of S4 are respectively $$S_1=(r_3 \cos \theta_3+r_5 \cos \theta_5, r_3 \sin \theta_3+r_5 \sin \theta_5)$$

$$S_2=(r_3 \cos \theta_3+r_6 \cos \theta_6, r_3 \sin \theta_3+r_6 \sin \theta_6)$$

$$S_3=(r_3 \cos \theta_3+r_7 \cos \theta_7, r_3 \sin \theta_3+r_7 \sin \theta_7), \text{ and}$$

$$S_4=(r_3 \cos \theta_3+r_8 \cos \theta_8, r_3 \sin \theta_3+r_8 \sin \theta_8).$$

16. The display apparatus of claim 1, wherein the display panel includes:
a substrate; and a display unit including a plurality of pixels arranged on the substrate, and wherein a size of the display unit is equal to a size of the substrate.

17. The display apparatus of claim 16, wherein each of the plurality of pixels is arranged at a first interval on the substrate, the first interval is a distance between centers of two adjacent pixels, and a second interval between centers of outermost pixels among the plurality of pixels and an outer surface of the substrate is equal to or less than a half of the first interval.

18. A tiled display apparatus comprising:

a stand frame;

a plurality of support brackets arranged in the stand frame;

a plurality of positioning modules connected to the plurality of support brackets, respectively; and a plurality of display apparatuses tiled to the plurality of positioning modules, respectively, wherein each of the plurality of display apparatuses includes:

a display panel and a support module configured to support the display panel, wherein the support module includes:

a rotating frame configured to support the display panel;

a fixed frame configured to support the rotating frame; and a link structure disposed between the fixed frame and the rotating frame and configured to rotate the rotating frame through at least four-bar link structure, wherein the rotating frame includes a magnetic portion having magnetism, and at least a portion of the fixed frame includes a metal material, and wherein the magnetic portion is disposed in the rotating frame to correspond to a portion of the fixed frame including the metal material.

19. The tiled display apparatus of claim 18, wherein each of the plurality of positioning module is coupled to a corresponding support bracket of the plurality of support brackets and a corresponding display apparatus of the plurality of display apparatuses so that the corresponding display apparatus moves in different 3-axis directions with respect to the support bracket.

* * * * *